United States Patent [19]

Boggs

[11] 3,900,580

[45] Aug. 19, 1975

[54] METHOD OF REMOVING CRUMBS FROM COOKING OIL

[75] Inventor: Weldon C. Boggs, Tampa, Fla.

[73] Assignee: Food Research & Equipment Co., Tampa, Fla.

[22] Filed: Sept. 11, 1972

[21] Appl. No.: 288,073

Related U.S. Application Data

[62] Division of Ser. No. 115,031, Feb. 12, 1971, Pat. No. 3,701,313.

[52] U.S. Cl. .............. 426/417; 426/438; 210/167
[51] Int. Cl. ............................................. B01d 43/00
[58] Field of Search ......... 210/DIG. 8, 77, 78, 167; 426/438, 523, 328, 417; 99/408

[56] References Cited
UNITED STATES PATENTS

| | | | |
|---|---|---|---|
| 1,907,265 | 5/1933 | Schwedersky | 99/408 |
| 3,100,747 | 8/1963 | Hall | 210/DIG. 8 |
| 3,107,601 | 10/1963 | Longmire | 99/408 |
| 3,210,193 | 10/1965 | Martin | 426/328 |
| 3,363,541 | 1/1968 | Anetsberger | 99/408 |
| 3,368,682 | 2/1968 | Boots | 99/408 |
| 3,410,199 | 11/1968 | Quednau | 99/408 |
| 3,483,982 | 12/1969 | Nelson | 99/408 |
| 3,573,861 | 4/1971 | Lecrone | 99/408 |

Primary Examiner—Raymond N. Jones
Assistant Examiner—Ernest G. Therkorn
Attorney, Agent, or Firm—Harry W. F. Glemser

[57] ABSTRACT

A deep fat fryer unit having solenoid operated valves controlled by switches, relays and motor driven timers for controlling the various phases of operation of the unit, including the pumping of oil from a storage tank into a heater tank and then into a cooking pot, through a filter, and return to the heater tank. The oil is continuously circulated through the heater tank and may be circulated through the cooking pot or bypass the cooking pot. A removable crumb conveyor continuously removes crumbs from a crumb well at the lower end of a filter bowl opening into the cooking pot and containing the filter. A vacuum switch is connected with the inlet of the pump and is set to close when the filter is about 50% clogged. Closing of the vacuum switch automatically effects return of the oil from the cooking pot to the storage tank and precludes resumption of normal cooking operations until after the filter has been cleaned. Upon removal of the filter and crumb conveyor, a pump-out adapter can be mounted in the filter bowl together with a pump-out hose and the oil pumped out of the crumb-well in response to operation of a sump switch. The storage tank and heater tank can be emptied one at a time by operating separate switches. An emergency STOP switch can be operated at any time to shut down the unit. Automatic signal lights on a control panel indicate when the unit is turned on, when the unit is in operation, when the heating grids are operating, when the heating grids are not working and oil is being circulated through the filter, and when a change of the filter is required.

5 Claims, 27 Drawing Figures

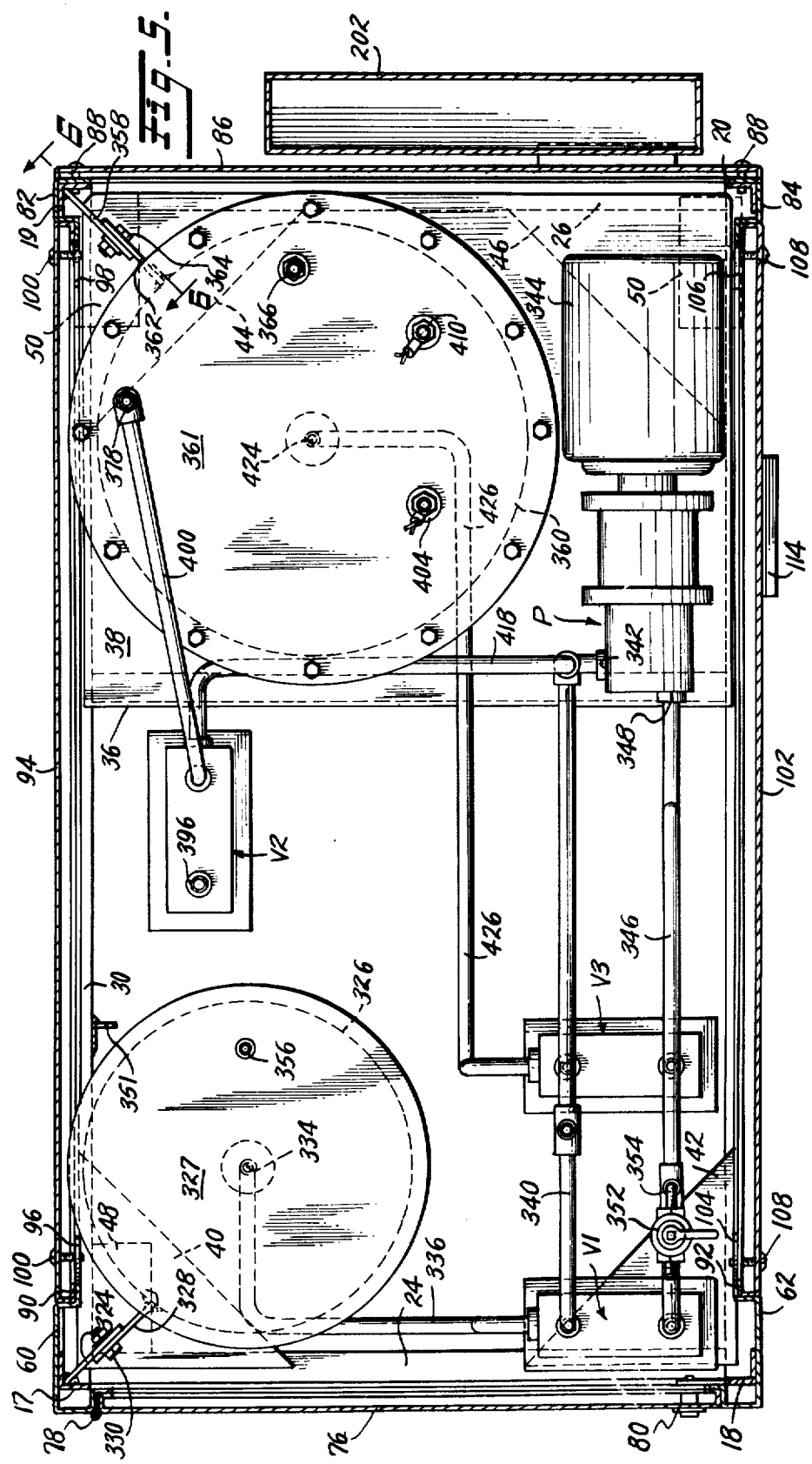

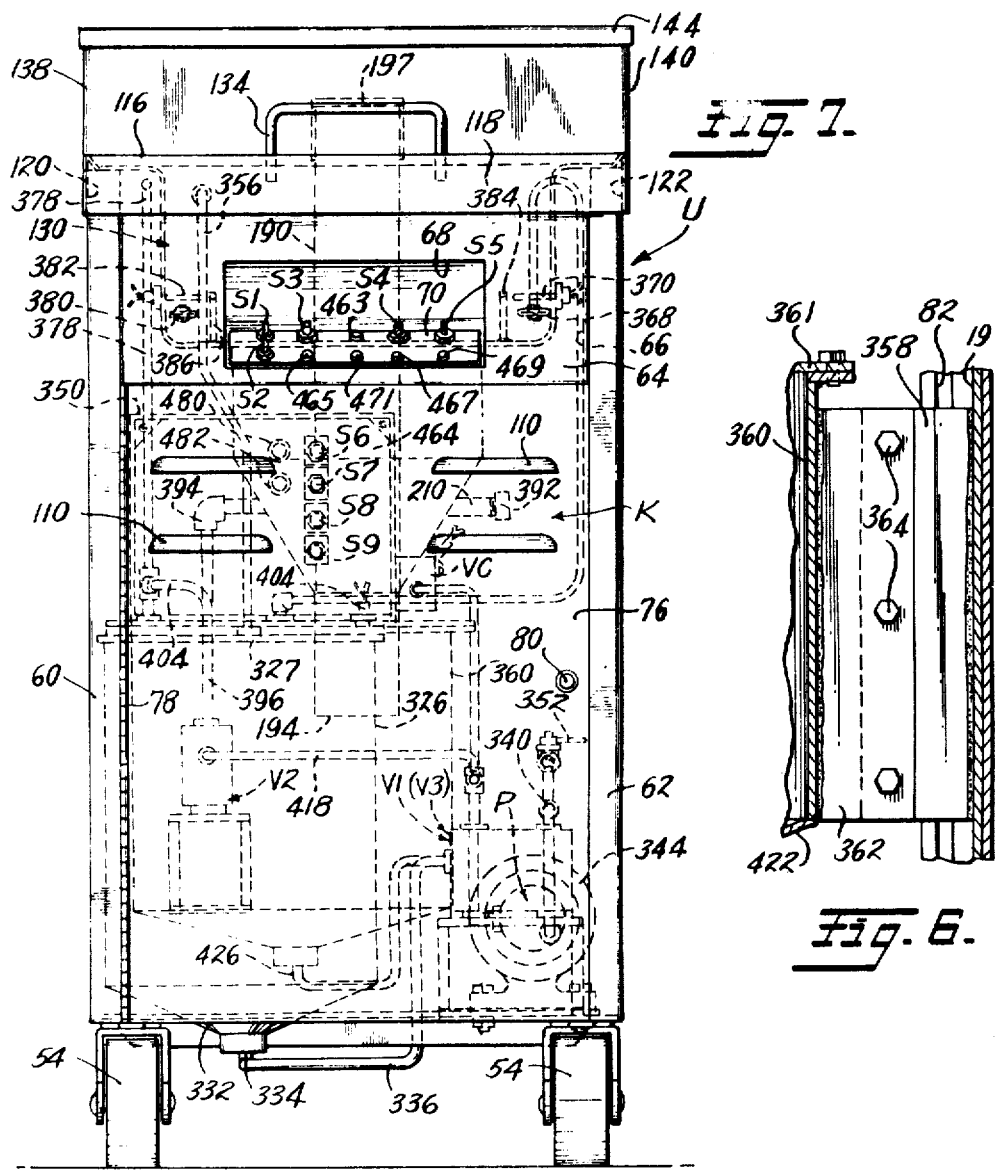
Fig. 7.
Fig. 6.
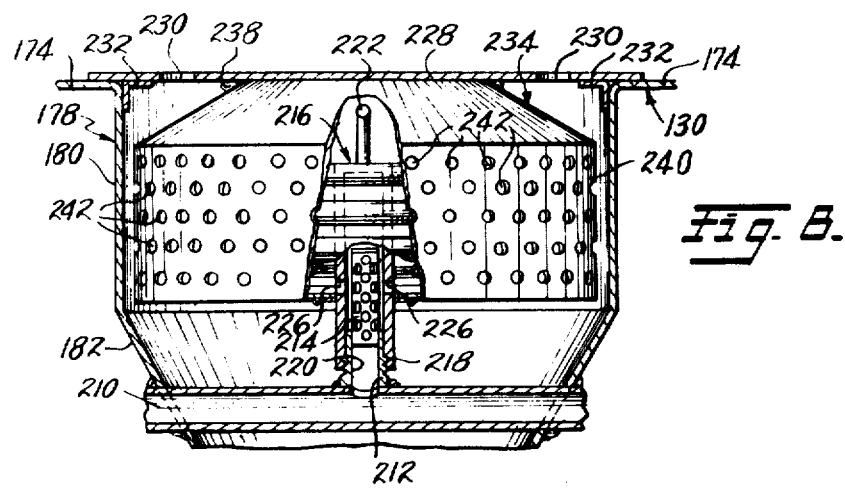
Fig. 8.

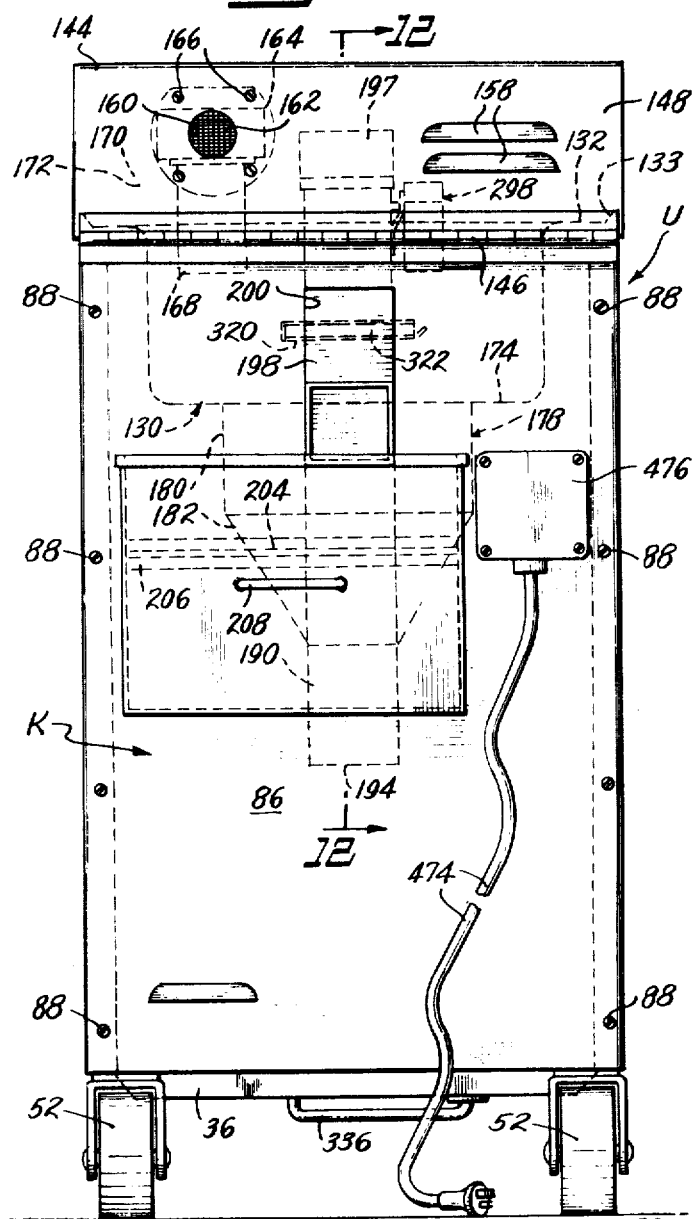
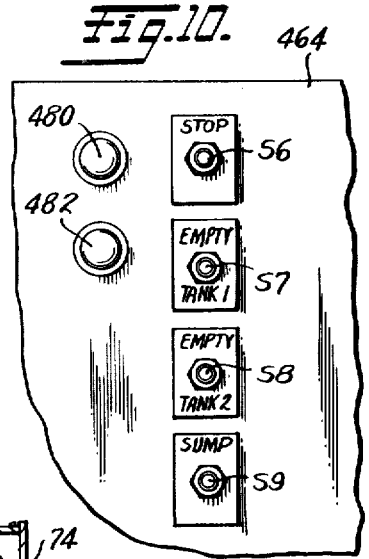
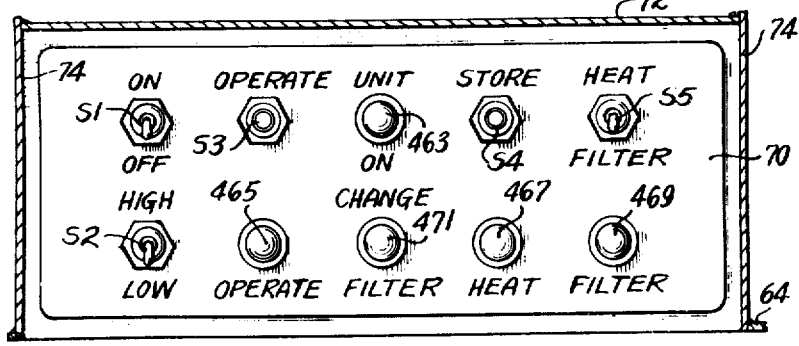

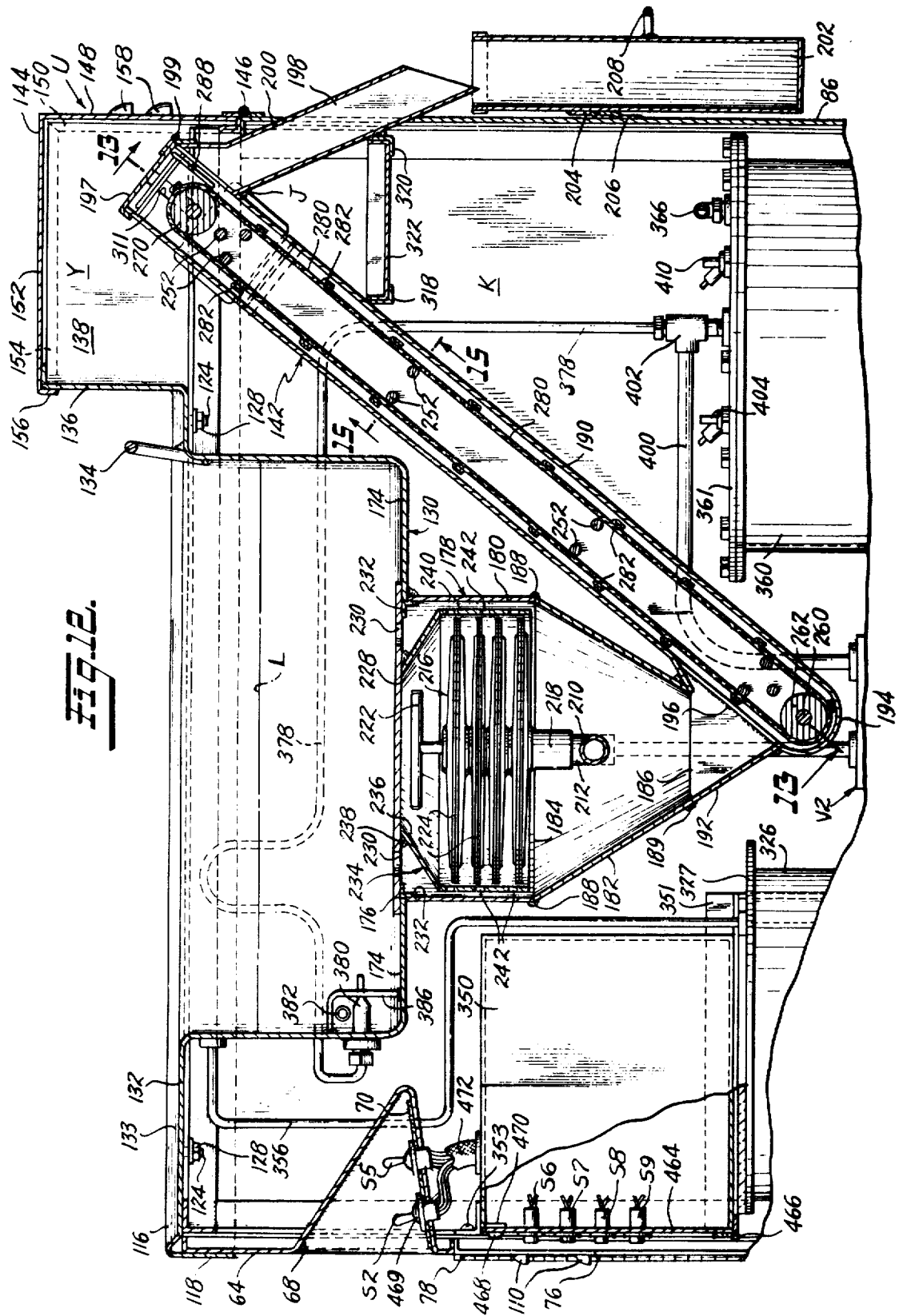

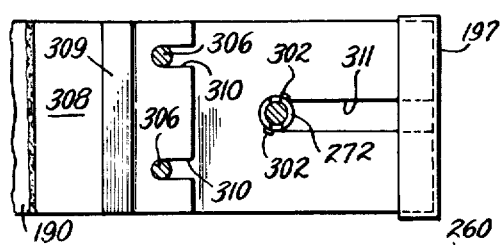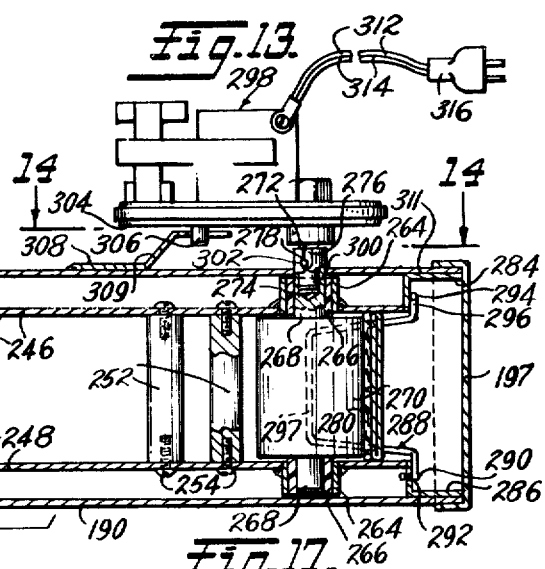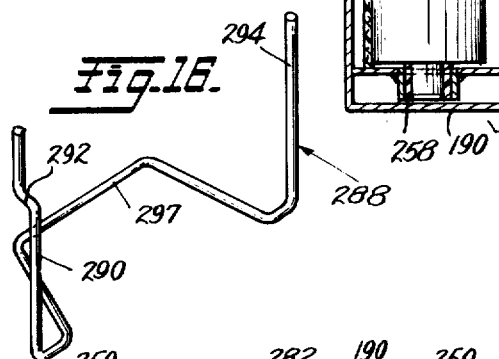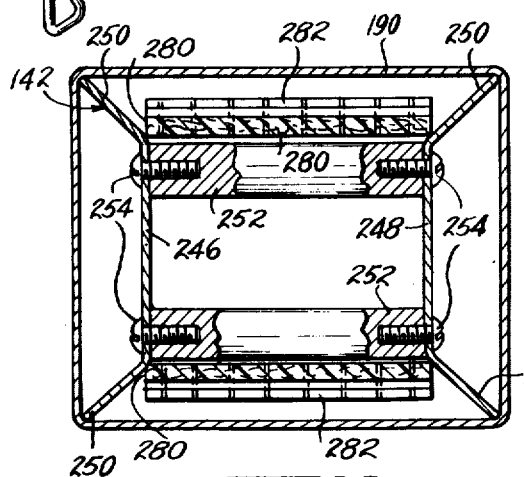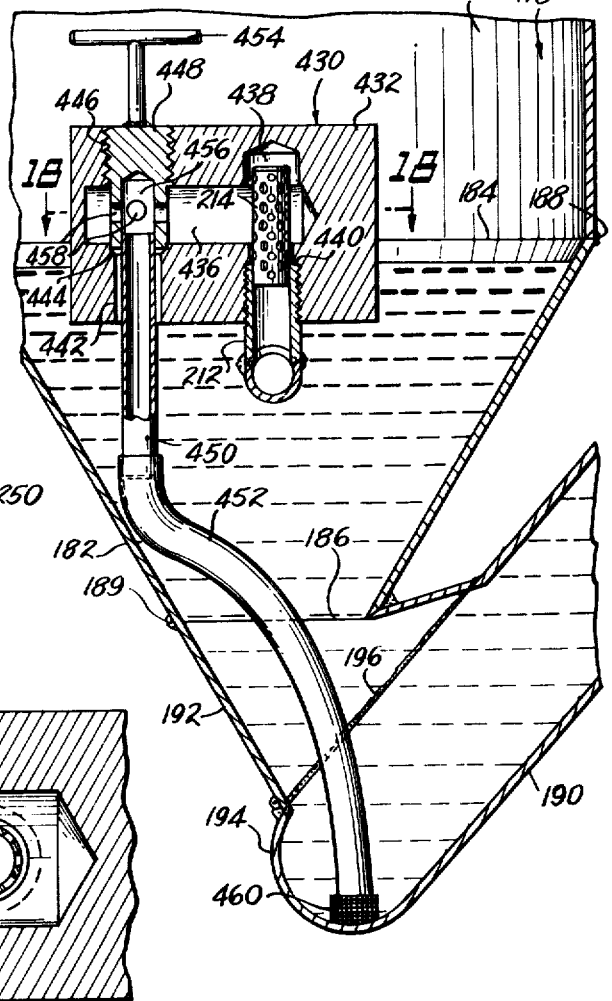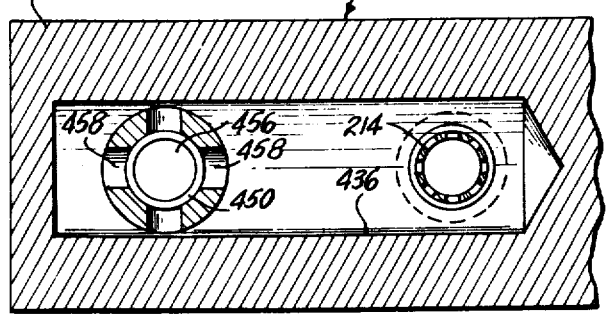

FILLING COOKING POT

OPERATE #2 BY PASSING COOKING POT

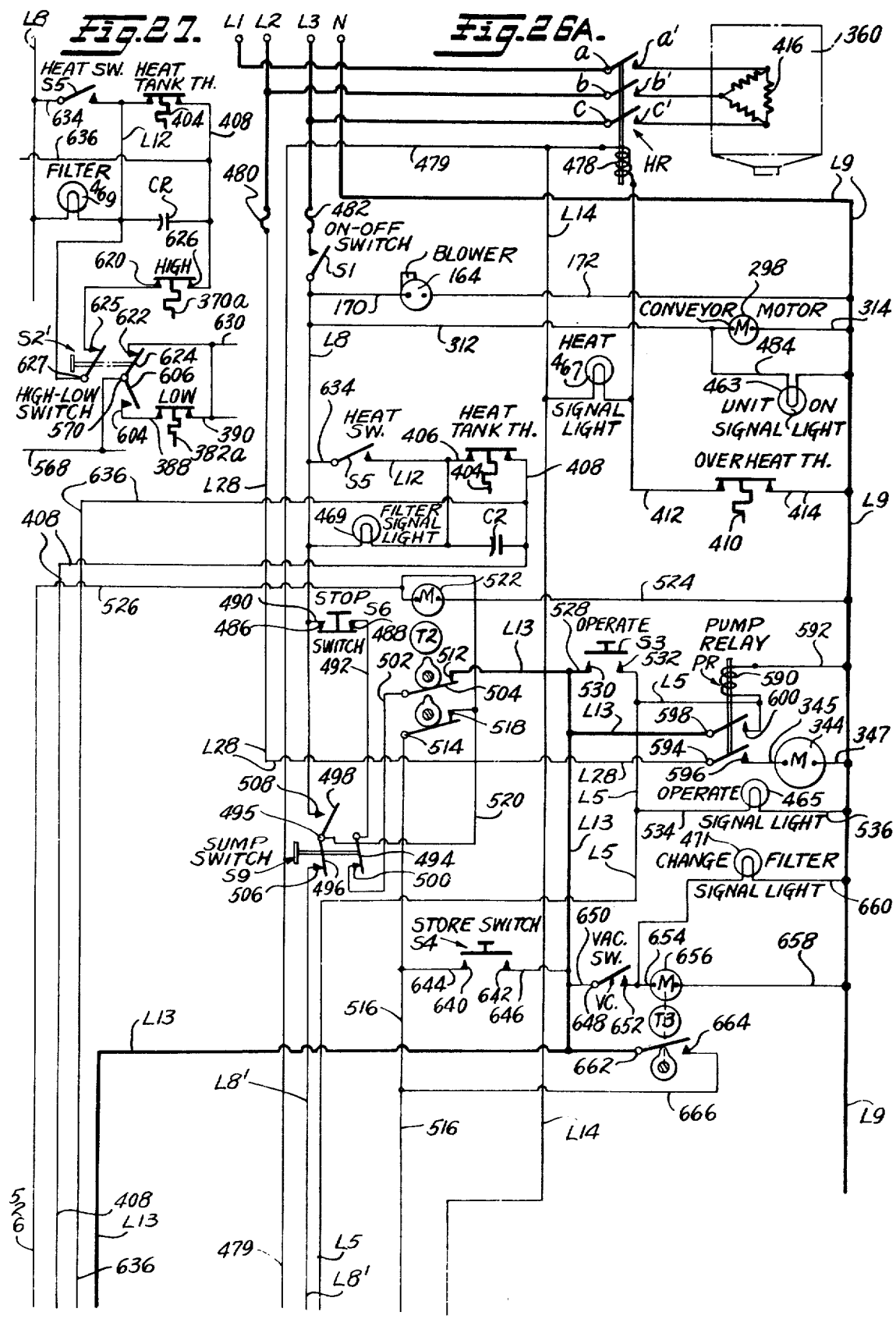

METHOD OF REMOVING CRUMBS FROM COOKING OIL

CROSS REFERENCE

This application is a division of my copending application Ser. No. 115,031, filed Feb. 12, 1971 now U.S. Pat. No. 3,701,313.

BACKGROUND OF THE INVENTION

1. Field of the Invention

This invention relates to a deep fat fryer unit for use in lunchrooms, restaurants, hotels, institutions and the like for preparing foods in cooking oil, such as french fried potatoes, onion rings, chicken, scallops, fish, shrimp, etc. Units of the general type involved here are disclosed in Martin U.S. Pat. No. 3,210,193 and Quednau U.S. Pat. No. 3,410,199.

2. Description of the Prior Art

Deep fat fryer units, in general, are subject to the problems that frequently arise from the failure of the operators thereof to follow correct procedures in operating the units, and in failing to properly clean and take care of such units.

One common fault with units including a cooking oil filter is that almost invariably, the filter is not cleaned or replaced as often as it should be, with the result that particles of food, crumbs, and/or batter are allowed to remain suspended in the cooking oil for too long a time. This leads to carbonization of the particles with consequent discoloration and breakdown of the cooking oil, thereby greatly shortening its useful life as well as impairing the quality of the food cooked in such oil.

Another problem with prior deep fat fryers, and particularly units including manually operable valves for initiating and effecting various phases of an operating cycle, is that the operators have frequently failed to operate such valves in the proper sequence, with the result that the units have been rendered temporarily inoperable pending corrective action by supervisory personnel.

A further objection to many prior fryer units is that, even though they included a filter for removing crumbs, etc. from the cooking oil, the filters do not remove all matter suspended in the cooking oil, which matter continues to be circulated and to be carbonized, thereby deleteriously affecting the cooking oil.

Still another objection to prior fryer units, and particularly those which include electrical grids for heating the cooking oil in a heating container, is that under certain conditions of operation, the quality of the oil is impaired by remaining in contact with the heating grids for too long a time. This situation can arise when there is only intermittent demand for heated oil in the cooking pot and circulation of the oil through the heating container is curtailed for lengthy intervals. This causes "film burning" in the oil in contact with the grids and the deposit of carbon on the grids. Thus, the oil is not only damaged, but the heating efficiency of the grids is also reduced.

SUMMARY OF THE INVENTION

The present invention overcomes the foregoing difficulties by providing a deep fat fryer unit with automatic controls that are not only simple to operate, but require the operator to perform certain necessary functions that are required to be performed, such as cleaning the filter, and wherein failure to clean the filter will disable the unit so that normal cooking operations cannot be carried on until after the filter has been removed and cleaned.

The present unit also provides a conveyor means for continuously removing crumbs from the cooking oil that were not removed by the filter.

The present unit further overcomes the objection to prior units by providing valve assemblies including solenoid operated valves that are controlled and operated in the proper sequence by manually operable switches, relays and electrically timed control switches, so that any given valve, or pair of valves, required to effect a given function in the cycle of the unit is/or are appropriately actuated.

The further objection to prior units because of film burning of the oil is overcome by the present unit which requires the cooking oil to be continuously circulated through the heater tank, regardless of whether or not any oil is being supplied to the cooking pot.

More specifically, the present deep fat fryer unit includes a cabinet that has a control panel upon which is mounted a master ON-OFF switch and a UNIT ON light to indicate that the unit has been turned on; a HIGH-LOW switch for selecting a cooking pot oil temperature controlled by cooking pot thermostats set to open at about 335°F and about 355°F, respectively, a HEAT-FILTER switch for supplying current to electrical heating grids in a heater tank and energizing a HEAT signal light to indicate that the heater is in operation; a signal light marked FILTER is energized when the heating elements are not functioning, and which also indicates that oil is circulating through the filter; an OPERATE switch for effecting pumping of oil from the heater tank to the cooking pot and from an oil storage tank to the heater tank, and for energizing an OPERATE signal light to indicate that the unit is ready for operation; a CHANGE-FILTER signal to indicate that the filter through which the oil is being drawn is partially clogged and requires cleaning; and a STORE switch for effecting the return of oil from the cooking pot to the storage tank.

The fryer unit has a closed circulating system for the cooking oil including the storage tank and heater tank, both of which are completely filled with oil to exclude air (to avoid oxidation) when the unit is out of service. The filter for the cooking oil is mounted in a filter bowl accessible through an opening in the bottom wall of the cooking pot. A continuously running pump and solenoid operated valve assemblies for the storage tank, cooking pot and heating tank, respectively, are connected by tubing to the cooking pot, storage tank and heater tank. Each of the solenoid operated assemblies includes two valves, the operating coils of which are connected in an electrical circuit and controlled by switches, relays and automatic timers to effect filling of the cook pot with cooking oil, circulation of the cooking oil from the heater tank through the cooking pot and filter, or circulation between the heater tank and the pump, etc.

A continuously operating crumb removal conveyor assembly, including an endless belt, extends into a crumb well at the lower end of the filter bowl for removing particles of food, crumbs or batter that have not been removed by the filter. The crumb conveyor is inclined and its lower end extends into the crumb well. The crumb well can be pumped out upon removal of the filter and crumb conveyor by the attachment of a pump-out adapter to the same fitting upon which the filter was mounted. Pumping out of the crumb well is controlled by a separate manual switch mounted upon the door of a control box within the cabinet. The storage tank and heater tank can be emptied by manually actuating separate switches when the cooking oil is to be changed. These switches are also mounted on the door of the control box. One very important feature of the invention is that the oil that passes through the filter is withdrawn from the filter bowl at a level substantially above the crumb well. This means that there will always be a substantial body of oil in the lower part of the filter bowl and in the crumb well that is not subject to circulation. Therefore, such oil will be relatively cool, compared to the temperature of the oil that is flowing into the filter bowl and being withdrawn from the filter bowl through the filter element. Consequently, any crumbs or other particles that settle by gravity, or remain suspended for a time in the lower zone of the filter bowl, are not subject to as high a temperature as the oil in the cooking pot. Hence, such particles do not carbonize and detrimentally affect the color and taste of the cooking oil. Moreover, such particles eventually settle through the body of cooler oil onto the belt of the conveyor and are promptly removed and discharged into a crumb container at the rear of the unit.

A vacuum switch is connected with the pump inlet and is set to close in response to a given degree of suction resulting from about a 50% clogged condition of the filter. Closing of the vacuum switch results in energizing the CHANGE-FILTER signal light, indicating to the operator that the filter requires cleaning, and effecting the automatic return of the cooking oil to the storage tank if the filter is not cleaned. Should the operator actuate the OPERATE switch to return oil to the cooking pot in an attempt to resume cooking, the suction on the vacuum switch will be temporarily relieved, but will soon be restored due to the partially clogged condition of the filter. The automatic storing cycle will be repeated forcing the operator to clean the filter before normal cooking operations can be resumed.

A heater tank thermostat is set to maintain the oil in the heater tank at a temperature of about 375°F to quickly restore any drop in the temperature of the oil in the cooking pot as cold food is introduced into the cooking pot. An overheat thermostat on the heater tank is set to open when the oil temperature reaches about 395°F, to prevent excessive heating of the oil. A STOP switch is provided to enable complete shutting down of the unit at any time.

In accordance with the foregoing, the principal object of the present invention is to provide an automatic, self-contained deep fat fryer unit that is capable of heating, continuously circulating, filtering and otherwise removing crumbs from and storing the cooking oil under conditions least conducive to oxidation and rancidity of the cooking oil and, hence, capable of greatly extending the useful life of the cooking oil.

Another object is to provide a deep fat fryer unit requiring a minimum of effort on the part of the operator and wherein various phases of the cycle of the unit are automatically time-controlled, and others are controlled by the manual operation of separate switches and relays.

Another object is to provide a fryer unit wherein the oil in the cooking pot, the filter bowl and crumb well, the storage tank and the heater tank can be drained therefrom by the manual operation of appropriate switches.

Another object is to provide a fryer unit in which the cooking oil is continuously circulated through the heater tank, and wherein the circulation of the oil is automatically controlled so that it either flows through the cooking pot, or bypasses the cooking pot.

Still another object is to provide means in a fryer unit that is automatically responsive to a given degree of clogging of the filter, for indicating to the operator that a filter change, or cleaning of the filter is required.

A further object is to provide a fryer unit having a filter and automatic means for warning the operator that the filter is becoming excessively clogged, and which will automatically store the cooking oil in the oil storage tank in the event that the operator fails to change the filter; and which will repeat the warning and storing cycle until the operator changes or replaces the filter, notwithstanding that the operator may attempt to continue operation of the unit and actuate the appropriate switch (OPERATE switch) to return the oil to the cooking pot to resume cooking operations.

A still further object is to provide a fryer unit, wherein duplex solenoid valve assemblies and electrical circuitry are provided to control the flow of the cooking oil for selectively filling the cooking pot, effecting continuous circulation of oil through the heater tank and cooking pot and filter, or bypassing of the oil around the cooking pot and filter, storing the oil, and draining all of the oil from the system.

Still another object is to provide an electrical circuit including timers for timing the cooking pot filling, manually initiated storing and automatically initiated, storing operations.

Still another object is to provide a fryer unit having means, in addition to a filter, for continuously removing crumbs from the cooking oil and discharging the same from the unit.

A still further object is to provide a unitary conveyor for continuously removing crumbs from the cooking oil.

A more specific object is to provide a motor-driven crumb conveyor that can be inserted into and removed from the fryer unit as a complete assembly.

Another object is to provide a method of collecting crumbs, etc. in a zone of relatively cool cooking oil and continuously removing the crumbs from said zone.

Still another object is to provide a readily removable filter for use in a filter unit and means to prevent crumbs from getting into the cooking oil circulating system during and after removal of the filter.

Another specific object is to provide means for pumping the cooking oil out of the filter bowl and crumb well after the filter and conveyor have been removed.

Still another object is to provide a fryer unit wherein crumbs that are not removed by the filter pass into a zone in which the cooking oil remains at a much lower temperature than that of the oil in the cooking pot, and from which zone the crumbs are continuously and automatically removed before they can adversely effect the quality of the cooking oil.

Other objects and advantages of the invention will be apparent from the following description taken in conjunction with the accompanying drawings.

DESCRIPTION OF THE DRAWINGS

FIG. 5 is an enlarged horizontal sectional view through the unit, taken on the line 5—5 of FIG. 1.

FIG. 6 is a fragmentary sectional view, taken on the line 6—6 of FIG. 5, showing the mounting means for the heater tank.

FIG. 7 is a front elevational view of the unit.

FIG. 8 is an enlarged fragmentary vertical sectional view through the filter bowl, taken on the line 8—8 of FIG. 1.

FIG. 9 is an enlarged fragmentary sectional view, taken on the line 9—9 of FIG. 1, particularly illustrating the instrument control panel having legends thereon identifying various switches and signal lights.

FIG. 10 is a fragmentary view of the cover of a control box mounted in the cabinet behind a front main door, showing certain switches mounted thereon.

FIG. 11 is a rear elevational view of the unit.

FIG. 12 is an enlarged transverse, vertical sectional view through the cooking pot, filter-bowl and crumb conveyor, taken on the line 12—12 of FIG. 11.

FIG. 13 is a fragmentary sectional view through the crumb conveyor assembly, taken on the line 13—13 of FIG. 12.

FIG. 14 is a fragmentary sectional view, taken on the line 14—14 of FIG. 13.

FIG. 15 is a transverse sectional view through the conveyor and conveyor housing, taken on the line 15—15 of FIG. 12.

FIG. 16 is a perspective view of a wiper wire for wiping the crumbs off the conveyor belt.

FIG. 17 is an enlarged vertical sectional view through the filter bowl showing a crumb well pump-out adapter mounted upon the fitting that normally supports the filter.

FIG. 18 is a horizontal sectional view, taken on the line 18—18 of FIG. 17.

FIGS. 26 and 26A comprise a schematic view of the complete electrical control circuit for the unit.

FIG. 27 is a fragmentary view illustrating a modified portion of the circuit for effecting continuous circulation through the cooking pot when the high heat thermostat is controlling the temperature of the oil in the cooking pot.

DESCRIPTION OF THE PREFERRED EMBODIMENT

The cooking oil of deep fat fryers is unavoidably contaminated by particles of food, batter, crumbs, etc. that separate from the principal food items that are being cooked. In the interest of brevity, the word "crumbs" will be used in the following description, and in the claims, with the understanding that it is inclusive of all solid contaminants.

Figure 2:
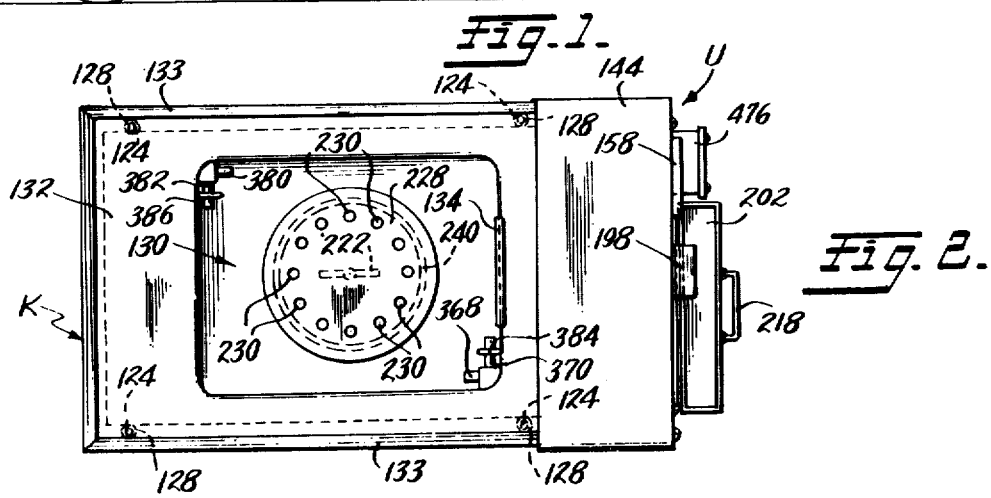
FIG. 2 is a plan view of the unit drawn to a reduced scale.
Figure 3:
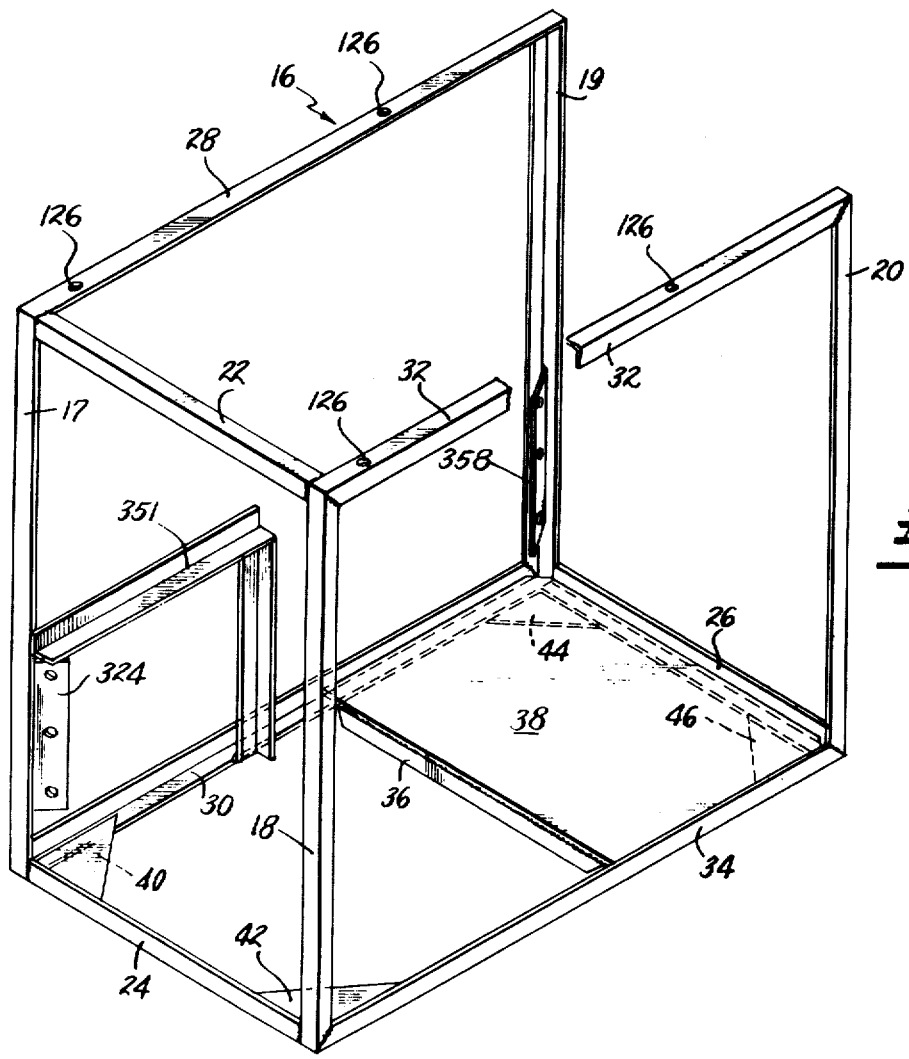
FIG. 3 is a perspective view of a skeleton frame for the unit.
Figure 4:
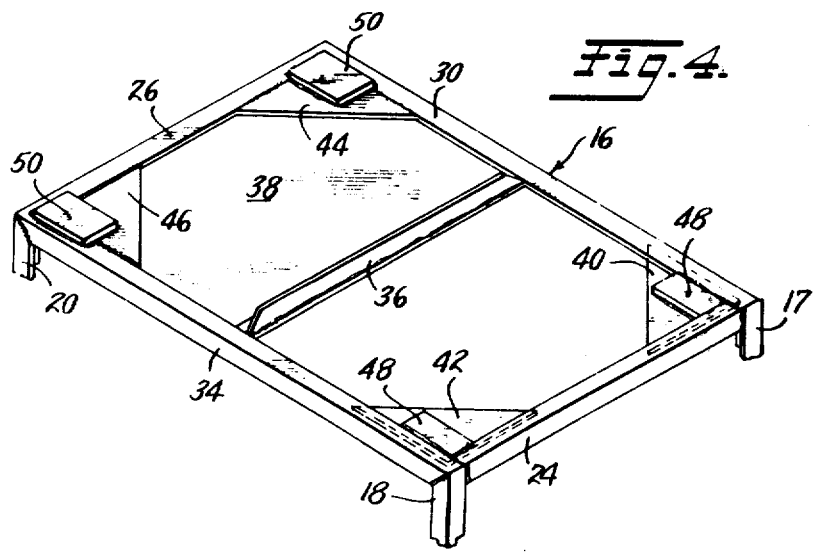
FIG. 4 is an inverted fragmentary perspective view of the lower end of the skeleton frame.

Referring to the drawings, the deep fat fryer unit is generally identified by the letter U and comprises a cabinet K, FIG. 2, made from stainless steel sheet material mounted upon a skeleton frame 16, best shown in FIGS. 3 and 4. The frame 16 is fabricated from sections of angle iron welded together and comprising front uprights 17 and 18, and rear uprights 19 and 20. The front uprights 17 and 18 are connected together at their upper end by a transverse angle iron 22, and at their lower end by a transverse angle iron 24. The rear uprights 19 and 20 are connected together at their lower end by a transverse angle iron 26. The angle irons 17 and 19 at the left side of the frame are connected together at their upper end by an angle iron 28 and at their lower end by an angle iron 30. The angle irons 18 and 20 at the right side of the frame 16 are similarly connected together by angle irons 32 and 34. An intermediate transverse angle iron 36 interconnects the lower angle irons 30 and 34 at a point about midway of the length thereof. A plate 38 is welded to the angle irons 26, 30, 34 and 36, and forms a bottom wall partially closing the lower end of the frame 16, the remainder being open to admit air for cooling purposes.

Figure 1:
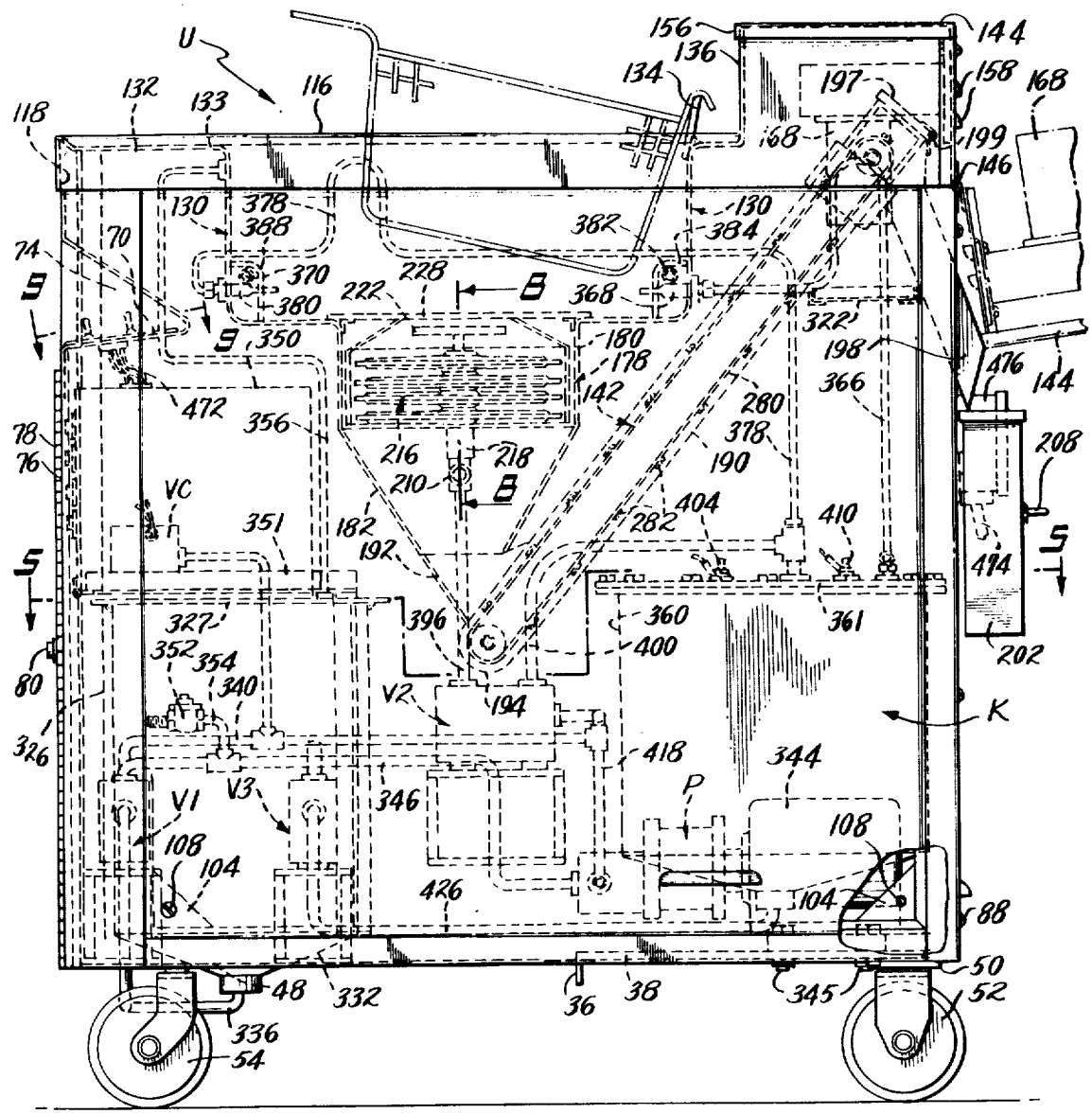
FIG. 1 is a right side elevational view of the deep fat fryer unit.

The lower end of the frame 16 is reinforced at its corners by a triangular gusset plate 40 welded to the angle irons 24 and 30, a gusset plate 42 welded to the angle irons 24 and 34, a gusset plate 44 welded to the angle irons 30 and 26 and a gusset plate 46 welded to the angle irons 26 and 34. A metal pad 48, FIG. 4, is welded to the frame 16 below the gusset plates 40 and 42 and a metal pad 50 is welded to the gusset plates 44 and 46. Rear casters 52, FIG. 1, are mounted upon each of the pads 50. Swivel casters 54 are mounted upon each of the pads 48 at the front of the unit. The casters 52 and 54 render the unit mobile so that it can be readily moved about, as desired.

The front uprights 17 and 18 are concealed behind left and right sections of corner trim 60 and 62, FIGS. 5 and 7 made from stainless steel and tack-welded to the front uprights 17 and 18 on the concealed side thereof. A front panel 64 has inwardly turned side edges 66 that are tack-welded to the adjacent sides of the corner trim 60 and 62. The front panel 64 has an opening 68 providing access to a control panel 70. The control panel 70 has legends thereon, FIG. 9, identifying various control switches and signal lights, as will be explained later.

The control panel 70 is mounted upon the lower portion of a stainless steel sheet 72 bent to a V-shape, closed at its opposite ends by plates 74, and welded at its front edges and at the front edges of the end plates to the inner side of the front panel 64. A front door 76 is mounted at the left edge upon the left corner trim 60 by a piano hinge 78. The door 76 is retained in closed position by a catch 80 engaged with corner trim section 62.

Referring to FIG. 5, the rear angle irons 19 and 20 are enclosed by sections of corner trim 82 and 84 fabricated from stainless steel sheet and tack welded to the angle irons. The trim sections 82 and 84 are overlapped at their rear face by a rear panel 86, which is secured along its vertical edges by screws 88, extending through the trim sections 82 and 84, into the rear angle irons 19 and 20. The left front trim section 60 and the left rear trim section 82 are flanged inwardly toward each other at 90 and 92, respectively, and define the sides of an opening to receive a left side panel 94. A triangular gusset 96 is welded to the flange 90 adjacent the angle iron 30, and a gusset 98 is similarly welded to the flange 92. The lower corners of the panel 94 are fastened to the gussets 96 and 98 by screws 100. Similarly, the right front trim section 62 and the right rear trim section 84 define an opening to receive a right side panel 102, and have gussets 104 and 106, respectively, welded thereto, to which the panel 102 is secured at its lower corners by screws 108.

The door 76 has four air louvers 110, FIG. 7, formed in the upper portion thereof just below the control panel 70, for admitting air into the cabinet K. The right side panel 102 has a single air louver 112, FIG. 2, adjacent its lower right end; and the rear panel 86 has a single air louver 114 adjacent its left lower end.

The cabinet K further comprises a top 116. FIGS. 1 and 7 that has a downwardly extending flange 118 at its front that telescopes over the upper edge of the front panel 64, a left side flange 120 that telescopes over the upper edge of the left side panel 94, and a right side flange 122 that telescopes over the upper edge of the right side panel 102.

The top 116 has four threaded studs 124, FIGS. 2 and 12, that are received in openings 126 in the upper angle irons 28 and 32 of the frame 16 and to which nuts 128 are applied for fastening the top 116 to the frame 16, and to hold the upper end of the side panels 94 and 102 in place.

The top 116 is provided with a cooking pot 130 and a surrounding apron 132 with a raised rim 133 along the front and sides thereof. The apron 132 slopes inwardly toward the cooking pot 130 to prevent cooking oil from running off the apron 132 and down the outside of the cabinet K. A bar 134 is mounted at the juncture of the apron 132 and the rear side wall of the cooking pot 130 serves as a support for a wire cooking basket which can be hooked onto the bar. The top 116 has an upright extension 136 at the rear of the apron 132, and side extensions 138 and 140 forming continuations of the side flanges 120 and 122, respectively. The extensions, 136, 138 and 140 provide an elongated opening Y at the rear of the unit U affording access to a crumb conveyor 142, which will be described later. The opening Y is normally closed by a rear cover 144 that is secured by a piano hinge 146 to the upper end of the rear panel 86. The cover 144 has a vertical wall 148 with flanges 150 that overlap with the rear vertical edges of the side extensions 138 and 140; and a horizontal wall 152 with flanges 154 that overlap the upper edges of the side extensions 138 and 140, and a flap 156 that overlaps the upper edge of the upright extension 136. The vertical wall 148, FIG. 11, has two air louvers 158 and an exhaust opening 160. The opening 160 is covered by a piece of screen mesh 162 within the cover 144, and the exhaust flange of a blower 164 is mounted upon the wall 148 by bolts 166. The blower 164 has a downwardly extending intake 168 into which air is drawn by the blower motor and discharged through the screened opening 160. Current is applied to the motor of blower 164 through electrical conductors 170 and 172.

The cooking pot 130, FIG. 12, has a bottom wall 174 provided with an opening 176 that communicates with a filter bowl 178 extending downwardly therefrom. The filter bowl 178 comprises a cylindrical side wall 180 and a transition section 182 that is circular at its upper end 184 and rectangular at its lower end 186. The transition section 182 is welded at its upper end to the filter bowl 178 as indicated at 188. The lower end of an elongated, inclined crumb conveyor housing 190 includes walls at its lower end forming a chamber that serves as a crumb well or crumb sump 192. The upper edges of the walls forming the crumb well 192 define a rectangular inlet that conforms to the rectangular opening at the lower end 186 of the transition section 182 and are welded thereto at 189. The crumb conveyor housing 190 is made of a stainless steel tube. This tube is generally rectangular in transverse cross-section, and is semi-circular at its lower end 194. The crumb well 192 communicates with the lower portion of the conveyor housing 190, and which housing is welded to the lower edges of the walls forming the crumb well 192, as indicated at 196. The upper end of the conveyor housing 190 is closed by a cap 197 and extends into the opening Y that is closed by the rear cover 144. A rectangular chute 198 is welded to the lower side of, and communicates at its upper end with the conveyor housing 190, the point of juncture J of the conveyor housing 190 and the chute 198 being at a level above that of the oil in the cooking pot 130. The cap 197 is secured by a hinge 199 to the chute 198, which extends through an opening 200 in the rear wall 86, as is best shown in FIG. 11. The lower end of the chute 198 discharges into a crumb collecting receptacle 202.

The receptacle 202 has a strip 204 with an offset therein welded to its rear wall for engagement with a similarly shaped strip 206 welded to the rear wall 86 of the cabinet K. The strips 204 and 206 interlock, as shown, and provide a sturdy support for the crumb receptacle 202. A handle 208 is fastened to the front wall of the receptacle 202 and aids in lifting the receptacle off the strip 206 when the receptacle is to be emptied.

As is best shown in FIGS. 8 and 12, a horizontal conduit 210 extends across the transition section 182 and is welded thereto at the regions where it extends therethrough. About midway of the length of the conduit 210, and welded thereto, is an externally threaded fitting 212. A strainer 214 is welded to the upper end of the fitting 212 and is closed at its upper end, but unobstructed at its lower end. A filter 216 is mounted upon the fitting 212 and comprises a hollow central core 218, which receives therein the strainer 214. The core 218 is closed at its upper end and has internal threads 220 at its lower end, which are screwed onto the fitting 212. A handle 222 is fastened to the closed end of the core 218 to enable manual removal and mounting of the filter upon the fitting 212. Four bellows-like filter sections 224 are mounted upon the core 218 with the uppermost and lowermost sections welded to the core and the intervening sections having the inner edges thereof spaced from the core. The core 218 has radial openings 226 that are located just above the upper end of the fitting 212 and through which cooking oil that has passed through the filter sections 224 can flow into the conduit 210.

The opening 176 in the bottom of the cooking pot 130 is closed by a filter bowl cover 228 having a circular row of holes 230 to allow flow of oil from the cooking pot 130 into the filter bowl 178. Four short angle section 232 are welded to the under side of the cover 228 to maintain it centered in the opening 176. A baffle 234 is arranged at the inner side of the cover 228 and comprises an imperforate conical portion 236 that is welded at 238 to the cover 228, and a cylindrical side wall 240 extending downwardly from the conical portion 236 to a point below the lowermost filter section 224 and assumes a position between the outer edges of the filter sections 224 and the inner surface of the filter bowl side wall 180. The baffle side wall 240 has strainer openings 242 throughout the extent thereof.

The openings 230 in the cover 228 permit oil and crumbs to pass into the filter bowl 178. The conical baffle section 236 prevents such crumbs from being deposited directly upon the upper filter section 224. Instead, the crumbs are deflected away from the filter 216 and are required to pass downwardly through the filter bowl 178 along the outer surface of the perforated baffle section 240. Of course, some crumbs of small size will be drawn through the openings 242 by pump suction, but will be unable to pass through the filter sections 224 because of their fine mesh. In any event, the major portion of the crumbs will be diverted by the baffle 234 and prevented from flowing onto the filter sections 224, wherefore, they will settle by gravity through the cooking oil in the transition section 182 and into the crumb well 192, from which they will be picked up and removed by the unitary conveyor assembly 142. Such diversion of the crumbs enables the unit U to operate for longer periods of time before requiring cleaning or replacement of the filter 216.

It is to be understood that all crumbs do not immediately descend into the crumb well 192, since some particles will be very light and will tend to rise or float in the cooking oil within the filter bowl 178 and thus be drawn toward the outer surface of the filter sections 224. However, the crumbs thus attracted to the filter sections 224 constitute only a small proportion of the total amount of crumbs that enter the filter bowl 178.

The conveyor assembly 142 is removably mounted in the conveyor housing 190 and comprises a frame including two elongated side plates 246 and 248, which have side edge portions 250 that are bent outwardly on an angle of about 45°, as is best shown in FIG. 15. The edges of the portions 250 ride in the corners of the conveyor housing 190 and center the conveyor 142 therein. The plates 246 and 248 are secured together in spaced relation by a series of spacers 252 consisting of sections of round stock having threaded holes in the opposite ends thereof to receive screws 254 for fastening the plates to the spacers 252. The plates 246 and 248 are rounded at one end to conform with the rounded end 194, FIG. 12, of the conveyor housing 190. These ends have aligned openings in which steel sleeves 256 are welded. Each of the sleeves 256 contains a Teflon bushing 258 serving as a bearing for the ends of a shaft 260 projecting from the opposite sides of a solid idler pulley 262.

The other ends of the plates 246 and 248 are equated off and also have openings to receive a steel sleeve, 264, FIG. 13, in which Teflon bushings 266 are mounted to serve as bearings for the ends of a shaft 268 projecting from a solid drive pulley 270. One end 272 of the shaft 268 projects outwardly beyond the conveyor housing 190 and has a hole 274 drilled therein and also has slots 276 that terminate in lateral notches 278 to provide a bayonet type joint for connection thereto of a motor driven shaft, as will be described later. An endless flexible belt 280, which may be made from dacron, nylon or any other suitable material that is substantially inert to hot cooking oil, extends around the pulleys 262 and 270 and has transverse cleats 282 stitched thereto at spaced intervals. The cleats 282 may be made from the same type of material as that from which the conveyor belt 280 is made. The conveyor housing 190 is arranged so that the upper run of the belt 280 travels upwardly across the lower end of the crumb well 192, as is best shown in FIG. 12.

Angle-shaped pieces 284 and 286 are welded to the respective upper ends of the side plates 246 and 248 with one leg of each of the angle pieces disposed adjacent a side wall of the conveyor housing 190, the edge of said one leg being substantially flush with the edge of the adjacent conveyor side wall. A generally U-shaped wiper wire 288 is mounted upon the angle pieces with one leg 290 of the wire being bent to provide an offset 292 therein such that when the leg 290 of the wire is inserted through a hole in the angle piece 286, and the leg is positioned parallel thereto, it will be retained therein. The other leg 294 of the wiper wire 288 engages the other angle piece 284 and is permanently spot welded thereto, as indicated at 296. The purpose of the offset 292 in the wiper wire 288 is to anchor the leg 290 while enabling the frame of the conveyor assembly 142 to be partially disassembled and the side plate 248 to be removed without deforming or damaging the wiper wire 288, should the belt 280 require replacement.

The wiper wire 288 is mounted so that a transverse portion 297 thereof does not contact the conveyor belt 280 but does engage the cleats 282 to wipe off any crumbs that may have adhered thereto as the cleats are moved past the wire. Actually, the wiper wire 288 is bent so that the portion 297 barely misses the outer surface of the conveyor belt 280 and exerts no pressure there against. This enables the transverse wire portion 297 to remove any crumbs that may be adhering to the belt 280 without also wiping cooking oil off the belt, which would be undesirable.

The conveyor belt 280 is driven by a conveyor motor 298. The conveyor motor 298 has a shaft 300 that is receivable in the hole 274 in the shaft and 272 of the pulley 270. A diametrical pin 302 is mounted in, and has ends that project beyond the sides of the shaft 300. The pin ends are slidable in the slots 276 in the shaft end 272. The motor 298 has a base 304 with a pair of pins 306 mounted therein. The conveyor housing 190 has a mounting bracket 308 with a medial offset 309. One end of the bracket 308 is welded to said housing 190 and the other end is spaced therefrom and has two notches 310 formed in its edge to receive the pins 306.

Electrical current to operate the conveyor motor 298 is supplied through conductors 312 and 314 connected to a conventional electric plug 316 that can be readily disconnected when said motor is to be detached from the conveyor assembly 142. The motor 298 is mountable upon the conveyor housing 190 and connectable with the pulley shaft end 272 in such manner that is is automatically locked in place. Thus, the end of the motor shaft 300 is inserted into the hole 274 in the pulley shaft end 272 with the pin 302 riding in the slots 276 until the ends 278 of the slots are reached, whereupon the motor shaft 300 is turned counter-clockwise relative to the shaft to effect a bayonet interlock between the two shafts. After the motor 298 has been thus connected with the conveyor drive pulley 270, the conveyor assembly 142 can be bodily inserted into the conveyor housing 190 and the pins 306 in the motor base 304 slid into the notches 310 in the mounting bracket 308. This interlocks the motor 298 against turning relative to the conveyor housing 190, and the bayonet interlock prevents any lateral movement of the motor that would disengage the motor shaft 300 from the drive pulley shaft end 272. As will be seen from FIG. 13, the conveyor housing 190 has a slot 311 extending into one of its side walls to receive the pulley shaft end 272.

As will be seen from FIG. 15, the conveyor belt 280 is disposed between the oppositely flared portions 250 of the conveyor side plates 246 and 248 with only the side edges at the inner side of the belt engaging the plates. Such engagement will prevent crumbs from getting into the space between the conveyor side plates 246 and 248. It will also be seen from FIG. 12, that the cleats 282 on the conveyor belt 280 are arranged so that, as the conveyor belt 280 moves through the rounded end 194 of the conveyor housing 190, the cleats 282 will engage the curved wall of the conveyor housing 190 and remove any crumbs that may have settled therein by gravity. Such crumbs are carried upwardly by the belt 280 along with any crumbs that settle through the relatively cool oil in the transition section 182 and crumb sump 192 directly upon the belt, for discharge from the conveyor housing 190 at the upper end thereof.

The angle pieces 318 and 320, FIG. 12, are welded to the conveyor housing 190 and to the chute, 198, respectively. These support a drip pan 322 which will catch any oil or crumbs that may find their way into the slot 311 as the conveyor 142 is being withdrawn from the conveyor housing 190. The drip pan 322 assures that any such oil or crumbs does not drop onto any other components in the cabinet K.

It will be understood that in order to remove the conveyor assembly 142, the hinged rear cover 144 must be swung out of the way to the dot-and-dash line position shown in FIG. 1. When in such position, the hinged conveyor housing cap 197 can be retracted and the upper end of the conveyor 142 grasped to remove the same. As is shown, the blower 164 is moved bodily with the rear cover 144 whenever the cover is opened. The louvers 158 in the cover 144 are located in the region of the conveyor motor 298 and their purpose is to enable air to be drawn into the cabinet K by the blower 164 for effecting cooling of the conveyor motor.

Referring to FIGS. 3 and 5, the left front angle iron 17 of the frame 16 has a plate 324 welded thereto at the juncture of the legs thereof, and a storage tank 326 has a similar plate 328 radially welded thereto, both plates having openings for bolts 330 for mounting the storage tank 326 on the frame 16. The storage tank 326 has a top wall 327 welded thereto, and a conical bottom wall 332, FIGS. 1, 7 and 19, with an opening 334 at its apex. A tube 336 connects the storage tank 326 with a chamber 338 in a storage tank valve assembly V1. The valve V1 is diagrammatically shown in FIG. 19 and includes two solenoid operated valves A and B. The chamber 338 is connected by a tube 340 to the inlet 342 of a positive displacement pump P driven by an electric motor 344 mounted on the plate 38 of the frame 16 by bolts 345, FIG. 1. The chamber 338 is also connected by a tube 346 to the outlet 348 of the pump P. The valve A is operated by an electromagnetic coil A' and controls flow between the chamber 338 and the tube 340. The valve B is controlled by a similar coil B' and controls flow between the chamber 338 and the tube 346.

Figure 19:
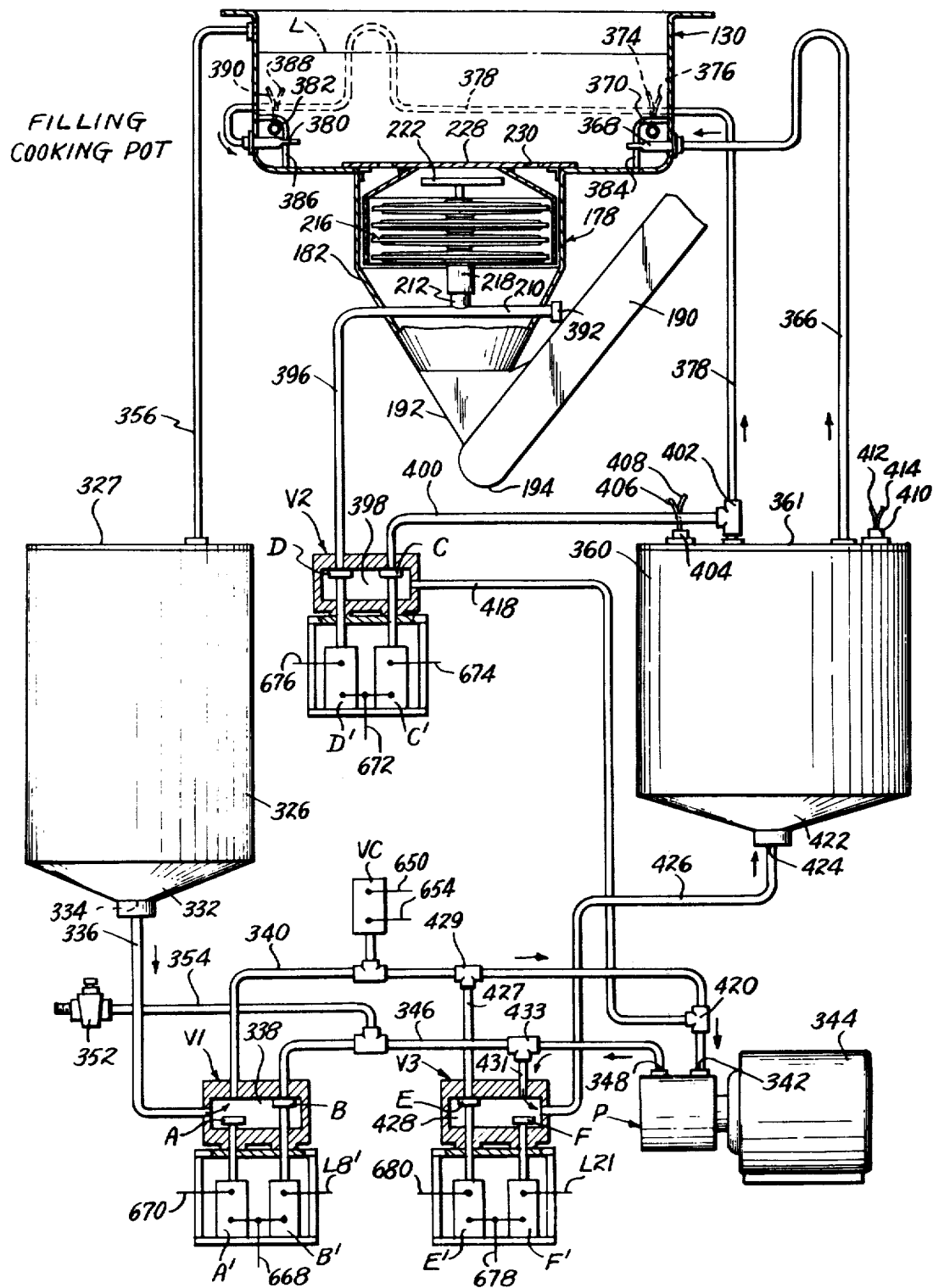
FIG. 19 is a diagramatic view of the principal components of the unit, showing certain of the valves open and indicating by arrows the direction of flow of the cooking oil during filling of the cooking pot.

A vacuum operated switch VC, FIG. 19, is connected in communication with tube 340 and is mounted upon the side wall of a control box 350, FIGS. 1 and 12. One end of the control box 350 is mounted upon an angle iron 351, FIGS. 3 and 12 connected with the angle irons 17 and 30. The front end of the control box 350 is connected by a bracket 353 with the front wall 64. A manually operable drain valve 352, FIG. 19, is connected with a tube 354, which branches off from the tube 346. The top 327 of the storage tank 326 is connected with the cooking pot 130 by a vent or breather tube 356. The tube 356 allows air to enter and leave the storage tank 326 as cooking oil is withdrawn or pumped into the tank. The point of connection of the breather tube 356 with the cooking pot 130 is well above the normal level L of the cooking oil in the cooking pot.

A plate 358 is welded to the rear left angle iron 19 of the frame 16, as is best shown in FIG. 3, and a heater tank 360, FIG. 5, has a similar plate 362 radially welded thereto. The plates 358 and 362 have openings to receive bolts 364, which mount the heater tank 360 within the cabinet K.

A tube 366, FIG. 19 connects the cover 361 of the heater tank 360 with a nozzle 368 mounted in one corner of the cooking pot 130 adjacent to a high temperature cooking pot thermostat 370. The thermostat 370 is connected to electrical conductors 374 and 376. A second tube 378 connects the cover 361 of the heater tank 360 with a nozzle 380 mounted in the corner of the cooking pot diagonally opposite to that in which the nozzle 368 is mounted. The nozzles 368 and 380 are directed to produce turbulence in the oil in the cooking pot and to work crumbs toward the openings 230 in the cover 228. A low temperature thermostat 382 is mounted in the cooking pot 130 adjacent to the nozzle 380. A guard 384 welded to the cooking pot protects the nozzle 368 and thermostat 370 from damage, and a similar guard 386 protects the nozzle 380 and the thermostat 382. The thermostat 382 is connected to electrical conductors 388 and 390. The thermostats 370 and 382 can be selectively rendered effective to control the temperature in the cooking pot by the HIGH-LOW toggle switch S2. The high thermostat 370 is set to maintain the temperature of the cooking oil in the cooking pot at about 355°F and the low temperature thermostat 382 is set to maintain the cooking oil temperature at about 335°F.

The horizontal conduit 210 in the filter bowl 178 is closed at one end by a cap 392 and has an elbow 394, FIG. 7, on its other end, the elbow being connected by a tube 396 with a chamber 398 in a cooking pot valve assembly V2. The valve V2 contains two solenoid operated valves C and D. The chamber 398 is connected by a tube 400, FIG. 19, to a pipe T 402 mounted in the tube 378. The valve C is operated by a coil C' and controls flow between the chamber 398 and the tube 400. The valve D is operated by a coil D' and controls flow between the tube 396 and the chamber 398.

A heater tank thermostat 404 is mounted on the cover 361 of the heater tank 360 and is connected with electrical conductors 406 and 408. The thermostat 404 is set to maintain the cooking oil in the heater tank 360 at a temperature of about 375°F. An overheat thermostat 410 is also mounted on the cover 361 of the heater tank 360 and is connected with electrical conductors 412 and 414. The overheat thermostat 410 is set to open at about 390°F to prevent overheating of the cooking oil. The heater tank 360 contains electrical heating grids (not shown) but diagramatically illustrated at 416 in FIG. 26A, wherein they are shown connected in an electrical circuit with the thermostats 404 and 410.

The thermostats 404 and 410 are also connected in the circuit with a HEAT switch S5, which controls the supply of current to the heater grids 416. The chamber 308 of the valve V2 is connected by a tube 418 to a pipe T 420 in the tube 340. The heater tank 360 has a conical bottom 422 with an opening 424 to which one end of a tube 426 is connected. The other end of the tube 426 is connected with a chamber 428 in a heater tank valve V3 comprising two solenoid operated valves E and F. The chamber 428 is connected by a tube 427 to a pipe T 429 in the tube 340. The chamber 428 is connected by a tube 431 with a pipe T 433 in the tube 346. The valve E is operated by a coil E' and controls flow between the chamber 428 and the tube 427. The valve F is controlled by a coil F' and controls flow between the chamber 428 and the tube 431.

The manner in which the vacuum switch VC, the coils A', B', C', D', E', and F' for operating the valves A, B, C, D, E and F, respectively, the cooking pot thermostats 370 and 382, the heater tank thermostats 404 and 410, and the pump motor 344, etc. are connected to an electrical control circuit which will be described in detail later.

It will be apparent from the hereinabove description of the filter bowl 178 and filter 216, that cooking oil cannot be withdrawn from the filter bowl 178 from a level below that of the openings 226 in the core 218 when the filter 216 is mounted on the fitting 212. This means that the oil below the level of the filter is not withdrawn and circulated.

Consequently, the body of oil that is below the filter 216, that is, in the transition section 182, the crumb well 192 and in the conveyor housing 190, is relatively cool. The reason for this is that cooking oil is a poor conductor of heat, so that while hot cooking oil is drawn through the openings 242 in the baffle 240 and then into the filter sections 224, the heat transfer from such oil to the body of oil below the filter is negligible. In fact, the temperature of the metal forming the crumb well 192 is cool enough so that it can be touched without burning the skin. This is a very important feature because the crumbs not held by the filter 216, settle into the crumb well 192, and since cooking oil in this zone is substantially cooler than the oil that is circulating through the cooking pot 130, filter bowl 178 and filter 216, such crumbs are not carbonized because of the low oil temperature. Hence, they do not damage the oil. Nevertheless, they are promptly removed by the conveyor belt 280, which continuously moves upwardly on an angle across the lower end of the crumb well 192.

Figure 23:
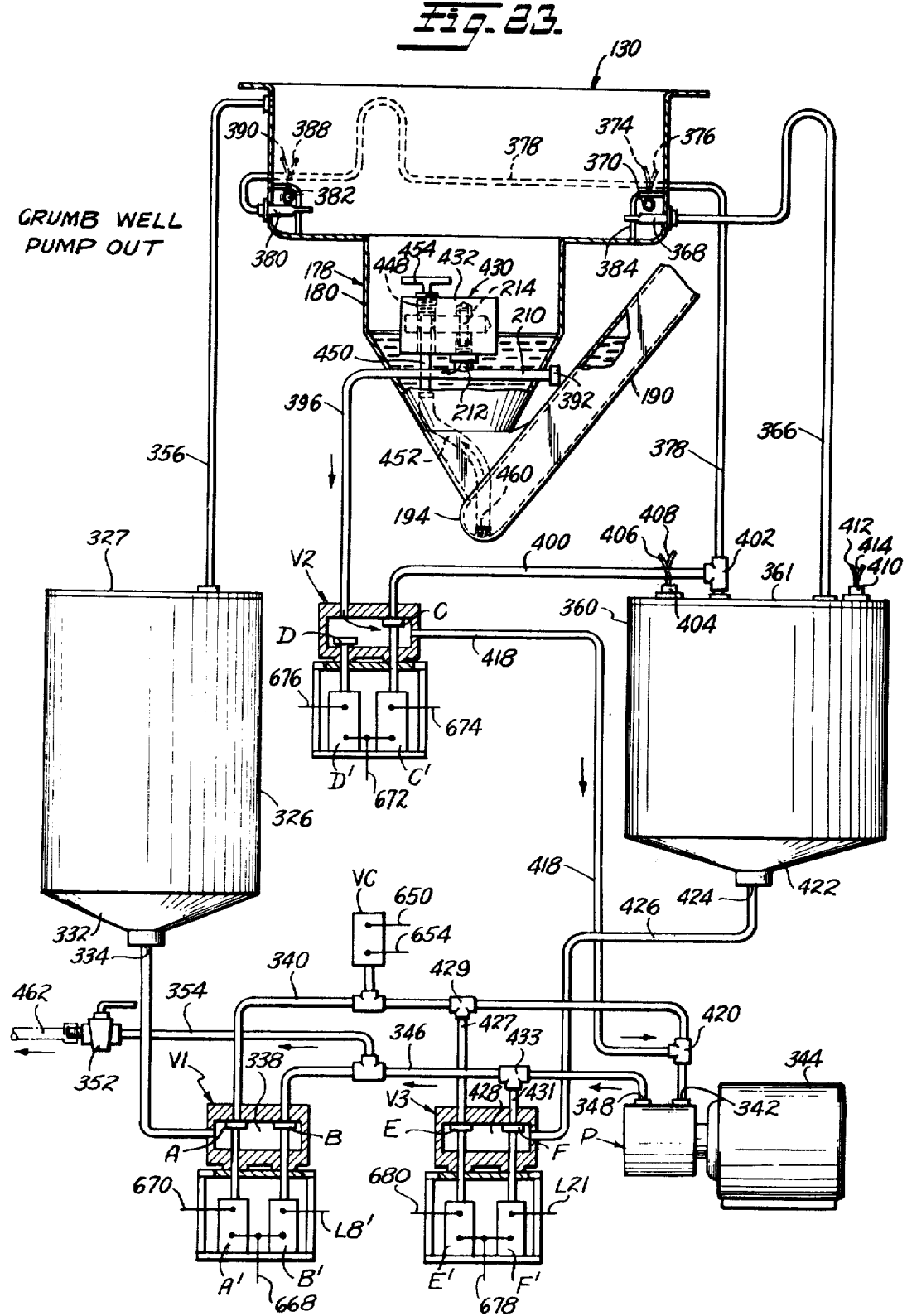
FIG. 23 illustrates the filter bowl with the filter bowl cover, filter and crumb conveyor removed and a crumb well pump-out adapter and hose mounted in the filter bowl for pumping cooking oil out of the crumb well.

Provision is made for removing the cooler oil from the crumb well or sump 192, when this is desired. In order to do this, the oil in the cooking pot 130 is first returned to the storage tank 326 by operating a STORE switch S4, as will be explained later. This will drop the oil level in the filter bowl 178 to that of the openings 226 in the core 218. The filter bowl cover 228 is then removed from the cooking pot opening 176 and the filter 216 is unscrewed from the fitting 212 by turning the handle 222 counter clockwise. Removal of the filter 216 will expose the strainer 214, which will permit some more oil to drain out by gravity, but prevent any light crumbs floating at the top of the oil from entering the fitting 212. The oil level then will be as shown in FIGS. 17 and 23.

After the filter 216 has been removed, the crumb conveyor 142 is removed from the conveyor housing 190, by opening the cover 144, swinging the cap 197 out of the way, disconnecting the electric plug 316, disconnecting the conveyor motor 298 from the pulley shaft end 272 and sliding the conveyor assembly 142 out of the housing 190. A pump-out adapter 430 comprises a body 432, FIG. 17, having a threaded opening 434 for mounting the body upon the fitting 212. The body 432 has a longitudinal cavity 436 and a branch cavity 438 to receive the upper end of the strainer 214. The body 432 is tightened on the fitting 212 until a shoulder 440 therein seats against the upper end of the fitting 212. The body 432 has a plain opening 442 with a shoulder or seat 444 at the upper end adjacent the cavity 436. A threaded opening 446 is aligned with the opening 442. A sub-assembly of a plug 448, tube 450 and a flexible pump-out hose 452 is next mounted in the adapter body 432. The plug 448 has a handle 454 attached thereto for screwing the plug into place in the opening 446 until the lower end of the plug 448 seats against the shoulder 444. The plug 448 has a longitudinal bore 456 at its lower end and a plurality of openings 458 extend through the wall of the plug and communicating with said bore. One end of the tube 450 is mounted in the lower end of the bore 456 and is welded or otherwise secured in place, the tube 450 extending through the opening 442. The pump-out hose 452 is connected at its upper end to the lower end of the tube 450 and a strainer 460 is attached to the lower end of said hose. As is shown, the strainer 460 reaches into the lower end 194 of the conveyor housing 190.

The oil can be pumped out of the crumb well 192 and conveyor housing 190 by operating a SUMP switch S9, as will be described in detail hereinafter. However, the phase of removing the cooking oil from the crumb well 192 is diagramatically illustrated in FIG. 23. As will be seen, the oil that is pumped out of the crumb well 192 is not returned to the storage tank 326, but is pumped through the manually operable drain valve 352, which must be open at the time. A drain hose 462 conducts the oil from the drain valve 352 to a suitable receptacle (not shown).

Figure 26:
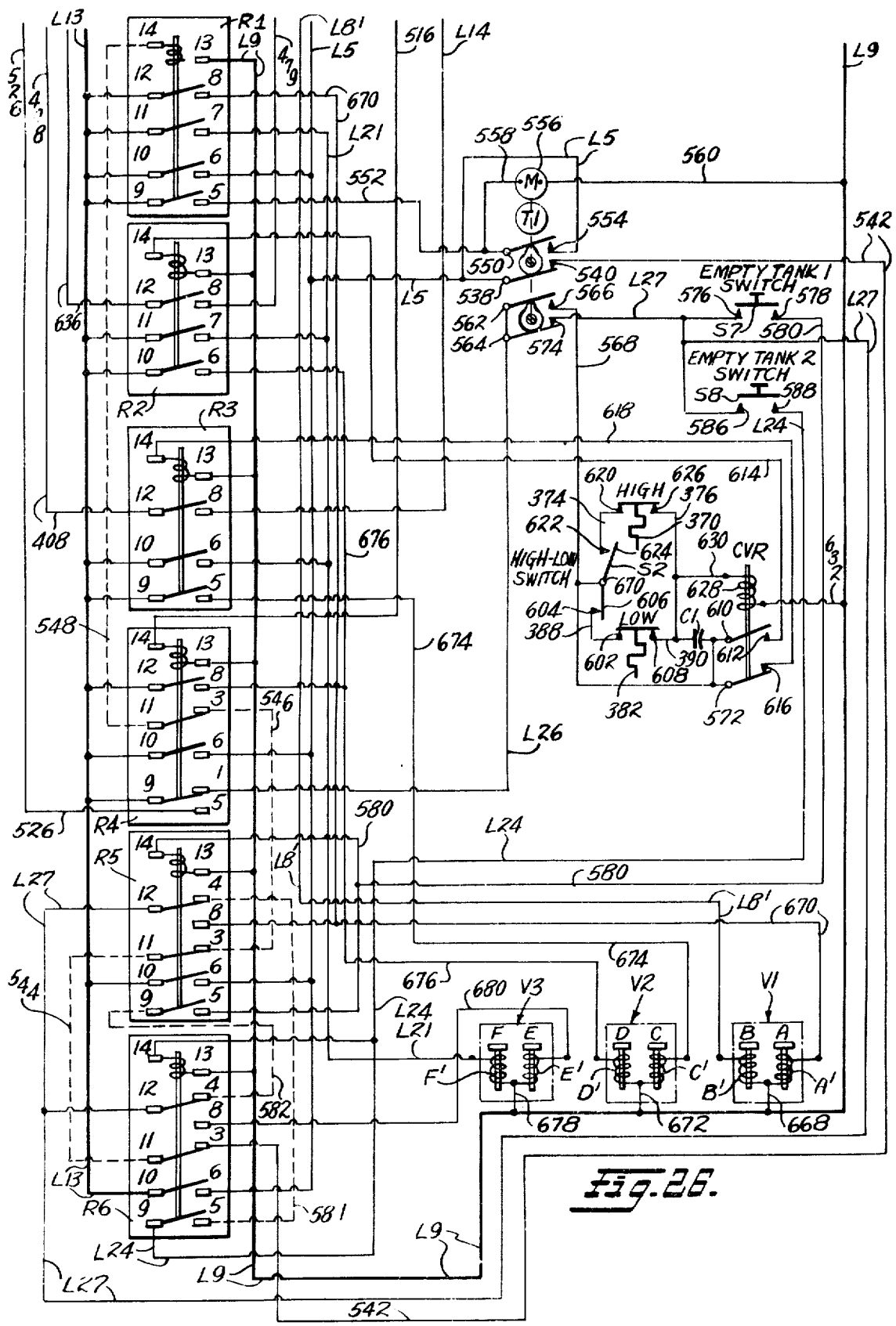

The operation of the various electrical components of the fryer unit is controlled by an electrical circuit schematically illustrated in FIGS. 26 and 26A. All of the electrical components are standard and available on the open market and, therefore, have not been illustrated in detail. It is to be understood, however, that such components as the relays and timers are housed within the control box 350 that is mounted in the cabinet K immediately behind the cabinet door 76 at the front of the unit, FIG. 7. The vacuum switch VC is shown mounted on the control box 150, as previously stated, it being understood that the wiring connections to said switch are within said box. The control box 350 has a cover 464 that is connected thereto along its lower edge by a hinge 466. The cover 464 is secured in closed position by screws 468 that are threaded into gussets 470 in the opposite upper corners of the box 350. FIG. 10 is a fragmentary view of the control box cover 464 illustrating certain switches and fuses mounted thereon, which will be described later. The various switches and signal lights mounted on the control panel 70 are connected with components within the control box by a wiring harness generally indicated at 472, FIG. 1.

The electrical control circuit for the unit will be more readily understood from the following brief description of the principal electrical components thereof and their function.

Referring to FIG. 9, S1 is an SPST master ON-OFF toggle switch that controls the supply of all electrical current to the unit. When this switch is turned on, it energizes a UNIT ON signal light 463 to indicate that current has been turned on, and supplies current to the motor of the blower 164 and to that conveyor motor 298.

S2 is a DPDT HIGH-LOW toggle switch that enables the operator to select operation of the cooking pot at a high or low temperature by selecting either the high temperature cooking pot thermostat 370, or the low temperature cooking pot thermostat 382. Oil circulation may then occur as diagrammatically shown in FIG. 20 or FIG. 21.

S3 is a SPST NO, momentary contact, push button OPERATE switch that controls the transfer of cooking oil from the storage tank 326 through the heater tank 360, to fill the cooking pot 130. This operation is diagrammatically illustrated in FIG. 19. Actuation of this switch energizes an OPERATE signal light 465 to indicate that the unit is in operation.

S4 is a SPST NO, momentary contact, push button STORE switch for effecting the flow of the oil from the cooking pot 130 to the storage tank 326. This phase of the cycle is illustrated diagrammatically in FIG. 22.

S5 is a SPST HEATER-FILTER toggle switch for turning current on and off to the heating grids 416 in the heater tank 360. A HEAT signal light 467 is energized when the heating grids 416 are energized. A FILTER signal light 469 is energized when the heater grids 416 are deactivated, but oil is circulating through the cooking pot 130 and filter 216.

The switches S1 to S5, inclusive, control the normal operations of the fryer unit and are all mounted on the control panel 70 convenient to the operator.

S6 is an SPST NC push button STOP switch that can be pressed to terminate all operations, except the blower 164 and crumb conveyor 142, FIG. 10.

S7 is a SPST NO push button EMPTY TANK 1 switch that must be depressed for emptying the storage tank 326 when the cooking oil is to be drained from the tank. This phase of the cycle is diagrammatically illustrated in FIG. 24.

Figure 25:
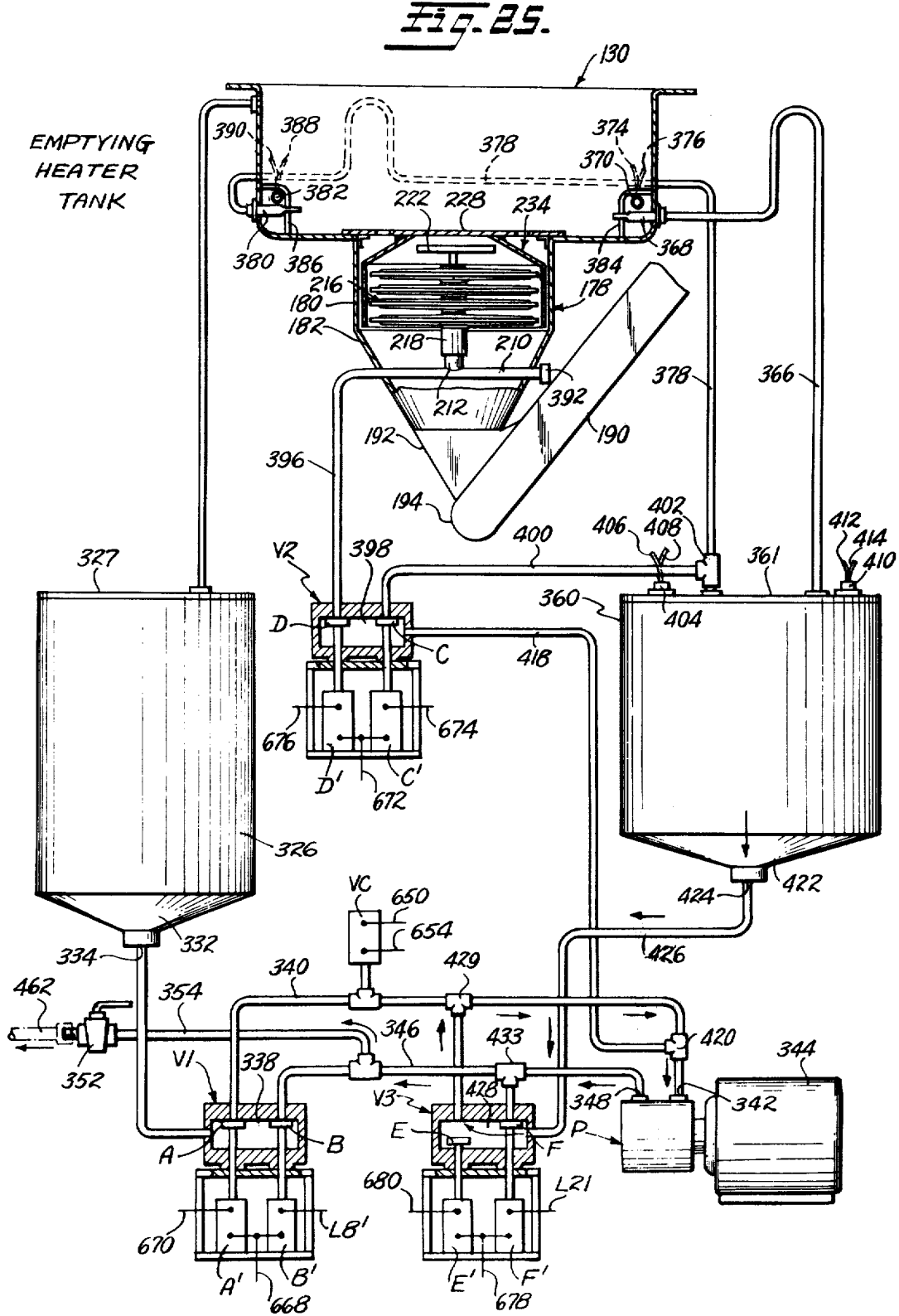
FIG. 25 illustrates the valves and direction of flow for emptying the heater tank.

S8 is a SPST NO, push button EMPTY TANK 2 switch that must be depressed for emptying the heater tank 360 to drain the oil from the tank. This operation is schematically illustrated in FIG. 25.

S9 is a DPDT, momentary contact, push button SUMP switch that can be actuated to effect pumping of the cooking oil out of the crumb well 192 to drain the oil from the fryer unit. This operation is diagrammatically illustrated in FIG. 23.

The switch S6 and the switches S7 to S9, inclusive, control the draining of oil from the fryer unit, and since they are used less frequently than the switches on the main control panel 70, and to avoid unintentional actuation thereof by the operator, they are mounted upon the cover 464, FIG. 10, of the control box 350, and are not accessible without first opening the cabinet door 76.

VC is a NO automatically operated, vacuum responsive switch that closes only when a pre-cut vacuum condition is present at the inlet of the pump P due to a partially clogged condition of the filter 216. Such condition is indicated on the control panel by energization of the CHANGE-FILTER signal light 471, FIG. 9.

Referring to FIGS. 26 and 26A, R1 is a FILL relay, which, in conjunction with the OPERATE switch S3 controls the flow of oil from the storage tank 326 to the heater tank 360 and then to the cooking pot 130 by effecting opening of the valves A and F, as is diagrammatically shown in FIG. 19.

Figure 20:
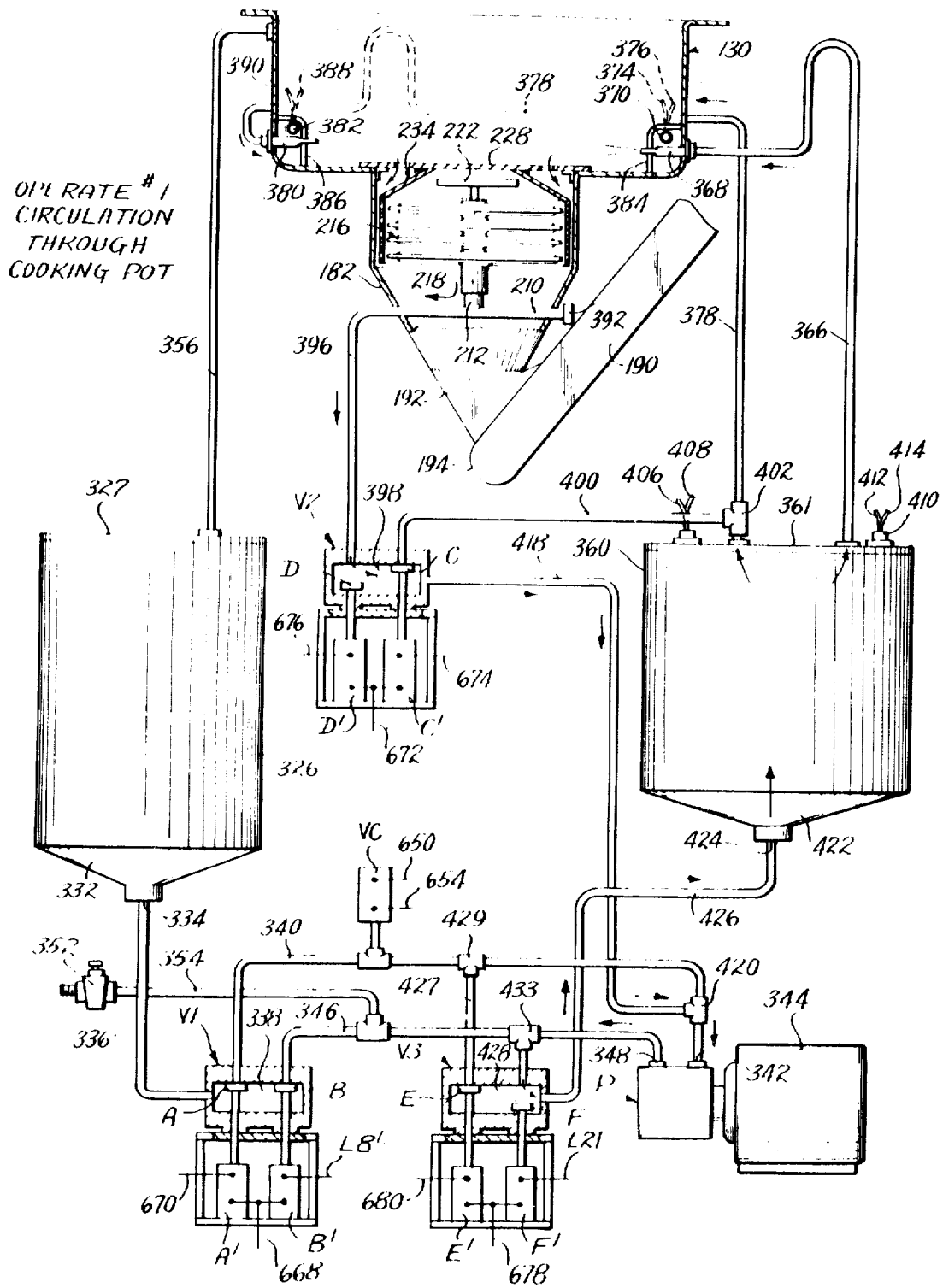
FIG. 20 is a view similar to FIG. 19, but illustrating the valves and direction of flow during the cooking phase, with oil circulation through the cooking pot and heater tank, under the control of one of the cooking pot thermostats.

R2 is an OPERATE 1 relay that controls circulation of the cooking oil in response to the actuation of the switch S2 to its LOW or HIGH position for regulating the cooking oil temperature under the control of the heat thermostat 370 or 382. This operation is shown in FIG. 20, wherein circulation of the cooking oil occurs through the cooking pot 130, filter 216 and heater tank 360.

R3 is an OPERATE 2 relay that controls the circulation of the cooking oil in response to actuation of the selector switch S2. The relay R3 controls the opening of valves C and F to effect circulation of the cooking oil through the heater tank 360 and bypassing of the cooking pot 130, as is diagrammatically shown in FIG. 21.

R4 is a STORE relay that operates in conjunction with the STORE switch S4 to effect opening of the valves B and D for flow of oil from the cooking pot 130 to the storage tank 326.

Figure 24:
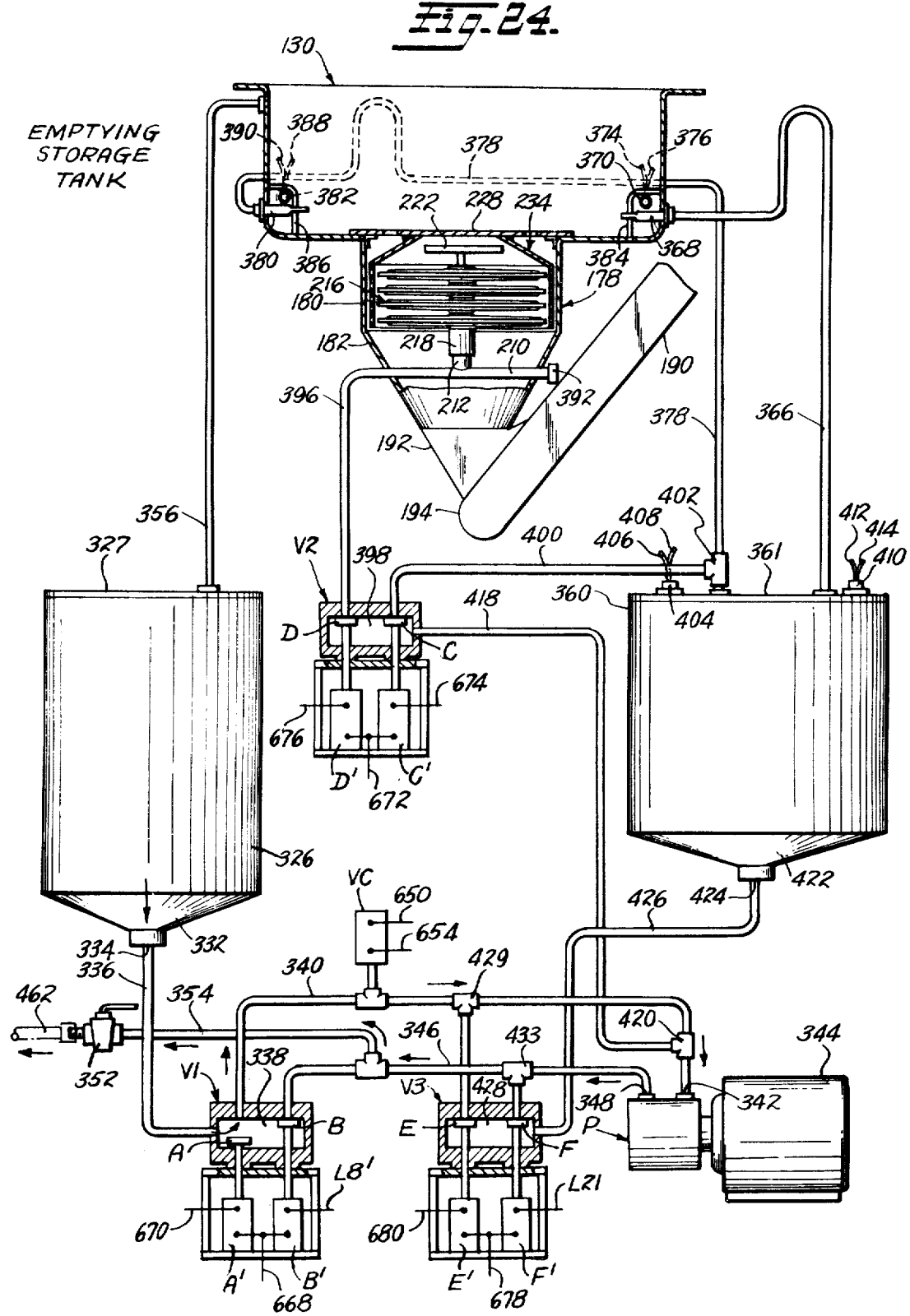
FIG. 24 illustrates the valves and direction of flow of cooking oil for emptying the storage tank.

R5 is a relay that operates in conjunction with EMPTY TANK 1 switch S7 to effect opening of the valve A for draining oil from the storage tank 326. This phase of operation is shown in FIG. 24.

R6 is a relay that is operated in conjunction with the EMPTY TANK 2 switch S8 for opening the valve E to drain oil out of the heater tank 360. This part of the cycle is shown in FIG. 25.

It is to be understood that the relays R1 to R6 are conventional and identical and that; each has 14 pins with standard numbering of the pins from 1 to 14, inclusive, pins 1, 2, 3 and 4 are indicated as NC contacts; pins 5, 6, 7 and 8 are indicated as NO contacts; pins 9, 10, 11 and 12 are common contacts; pins 13 and 14 are connected with the operating coil of each relay, FIG. 26 of the drawings identifies the pins in accordance with the pin numbers indicated; not all pins on all relays are utilized in the circuit. Pins numbered 1 to 12, inclusive will herinafter for convenience be called contacts.

T1 is a conventional motor driven FILL timer that operates two micro switches, the timer motor being energized through relay R1 in response to actuation of the OPERATE switch S3. The timer T1, as well as timers T2 and T3 referred to hereinafter, include one or more cams for operating the micro switches, the cams being mounted on a motor shaft that rotates about 270° in ninety seconds before the motor "times out". After the current to the motor is cut off, a spring returns the motor shaft to its initial position. The motor of timer T1 remains energized until:

1. The ON-OFF switch S1 is opened;
2. The STOP switch S6 is pressed to open; or
3. Ninety seconds has elapsed and the motor of T2 has "timed out".

T2 is a motor driven STORE timer that operates two micro switches and is energized and operates for ninety seconds to control the time interval for the flow of oil from the cooking pot 130 to the storage tank 326, and is energized by operating the STORE switch S4, or is automatically energized by the vacuum switch VC when it is closed due to clogging of the filter 216.

T3 is a motor driven CHANGE-FILTER timer that actuates one micro switch and is energized only by the closing of the vacuum switch VC, which energizes the CHANGE FILTER signal light 471, and provides a ninety second time delay before automatically effecting storing or return of oil from the cooking pot 136 to the storage tank 326.

CVR is a circulation valve relay that controls the circulation of the cooking oil either through the cooking pot 130, filter 216 and the heater tank 360, or bypasses the oil around the cooking pot and filter and effects circulation through only the heater tank 360. This relay operates in conjunction with other relays to effect opening of the valves D and F for circulation through the cooking pot 130, filter 216 and heater tank 360, or effects opening of the valves C and F to effect bypassing of cooking oil around the cooking pot 130 and circulation through the heater tank 360 and pump P.

PR is a pump relay that controls the operation of the motor 344 for driving the pump P, and is energized so long as voltage is applied to its operating coil.

HR is a relay for controlling the heater grids 416 and is energized to supply current as the FILL timer T1 "times out" after ninety seconds of operation and remains energized so long as the overheat thermostat 410 in the heater tank 360 is in its normal closed position.

Referring to FIGS. 26 and 26A, since many components of the circuit derive current from a common terminal connected with a main conductor, such terminal will be most conveniently described as a conductor or line. Current for operating the fryer unit is supplied through main supply lines L1, L2, L3 and N (neutral). The main conductors L1, L2, L3 and N are contained in a flexible main cable 474, FIG. 11, that is connected to a lead-in box 476 mounted on the rear wall 86 of the cabinet K. Main conductors L1, L2 and L3 provide current of 220 volts AC to operate the heater grids 416 and main conductors L2 and L3 supply 110 volts AC for operating the various relays and timers. The main conductors L1, L2 and L3 are connected with separate movable contacts $a$, $b$ and $c$, respectively of the heat relay HR. The relay HR has a coil 478 for actuating the contacts $a$, $b$ and $c$ to engage with contacts $a'$, $b'$ and $c'$, respectively, to complete the circuit to the heater grids 416 in the heater tank 360 when the relay coil 478 is energized.

The relay coil 478 of the heat control relay HR has one side thereof connected with the conductor 412 going to the overheat thermostat 410, the conductor 414 extending from the overheat thermostat 410 to a multi-contact terminal illustrated as the line L9. The other side of the coil 478 is connected by a conductor 479 going to contact 8 of relay R2. The coil 478 is also connected by a conductor L14 to contact 8 of relay R3. The HEAT signal light 467 is connected with the conductor L14 and conductor 412 so that it is in parallel with the coil 478, and, therefore, is energized whenever the relay HR is energized to supply current to the heater grids 416.

The main conductor L1 is connected only with the heat relay contact $a$, while the main conductor N is connected only with the line L9. A line fuse 480 is connected in the line L2, which is also connected to a conductor L28. A line fuse 482 is connected in the main line L3, which is connected with a multi-connection terminal illustrated as line L8, and which has the master ON-OFF switch S1 connected therein. The line fuses 480 and 482 are mounted on the cover 464 of the control box 350. The switch S1 controls the supply of all electrical current to the fryer unit. The conductor 170, which supplies current to the motor of the blower 164 is connected to the line L8 at a point beyond the switch S1, and the other conductor 172 of said motor is connected with the line L9. The conductors 312, which supplies current to the conveyor motor 298 is also connected to the line L8 and the other conductor 314 of said motor is connected to the line L9, such connections being made through the electric plug 316, not shown in the wiring diagram. The UNIT ON signal light 463 is connected in a conductor 484 arranged in parallel with the conveyor motor 292, as shown. Accordingly, the blower 164 and the conveyor motor 298 run continuously so long as the switch S1 is closed. Energizing of the UNIT ON signal light 463 indicates to the operator that the power to the fryer unit has been turned on and that the unit is ready for operation.

The STOP switch S6, FIG. 26A, has 2 NC contacts 486 and 488. The contract 486 is connected by a conductor 490 with the line L8 and the contact 488 is connected by conductor 492 with NC contact 494 of the switch S9. The contact 494 engages a contact 500, which is connected by a conductor 502 to NC contact 504 of a micro switch operated by the timer T2. The switch S9 has a contact 495 that is common to NC contacts 496 and 498. The contact 496 is engaging with a contact 506 connected with a line L8'. NO contact 498 is engageable with the contact 508 also connected with the line L8. Thus, so long as the STOP switch S6 is closed, current is available through NC contacts 504 and 512 of the timer T2 to supply current to a multi-contact terminal illustrated as line L13.

A NC contact 514 of another micro switch operated by the timer T2 is connected by a conductor 516 to the coil pin 14 of relay R4. The contact 514 is engaged with a contact 518 that is connected by a conductor 520 to one side of a motor 522 that drives the timer T2 and to common contact 495 of the SUMP switch S9. The other side of the timer motor 522 is connected by conductor 524 to the line L9. The conductor 520 is connected by a conductor 526 to contact 5 of relay R4.

A lead 528 from the line L13 is connected with one contact 530 of the push button OPERATE switch S3. The other contact 532 is connected to a multi-contact terminal illustrated as line L5. When the switch S3 is closed, it completes a circuit to the line L5 and through a conductor 534 to one side of the OPERATE signal light 465, the other side of which light is connected by a conductor 536 with the line L9.

The line L5 is connected to NC contact 538 of a micro switch controlled by the timer T1. Contact 538 engages contact 540, which is connected to a conductor 542 to complete a circuit to NC contact 3 of relay R6. Current is bridged from NC contact 3 of relay R6 to contact 11 to complete a circuit through a conductor 544 to contact 11 of relay R5, which is engaged with NC contact 3 of the relay. A connection is made by a conductor 546 from contact 3 of relay R5 to NC contact 3 of relay R4, which is bridged to contact 11 of relay R4, which is connected by a conductor 548 to coil pin 14 of relay R1, pin 13 of the other side of said coil being connected with line L9. It will be noted that in FIG. 26, all conductors interconnecting contacts of relays R1 to R6, inclusive, have been drawn as dotted lines to distinguish the same from other conductors.

A NO contact 550 of the micro switch controlled by timer T1 is connected to contact 5 of relay R1 by a conductor 552. A contact 554 that is engageable by contact 550 is connected to line L5. One side of a motor 556 for driving the timer T1 is connected by a conductor 558 to the conductor 552 and, hence, to contact 5 of relay R1. The other side of the motor 556 is connected by a conductor 560 to line L9.

A second micro switch controlled by the timer T1 has NO contact 562 and NC contact 564, both of which are connected with NC contact 1 of relay R4 by a conductor L26. The NO contact 562 is engageable with a contact 566 that is connected to a conductor 568 that goes to a common contact 570 of the HIGH-LOW switch S2 and to NC contact 572 of the relay CVR. NC contact 564 is engaged with a contact 574 that is connected to a multi-contact terminal illustrated as line L27 going to one contact 576 of the EMPTY TANK 1 switch S7, the other contact 578 of which switch is connected by a conductor 580 to both coil pin 14 and contact 5 of relay R5.

Line L27 is also connected with one contact 586 of EMPTY TANK 2 switch S8, the other contact 588 being connected by line L24 to both coil pin 14 and contact 9 of relay R6.

The OPERATE switch S3, when closed, completes a circuit through line L5 to one side of a coil 590 of the pump relay PR. The other side of the coil 590 is connected by a conductor 592 with the line L9, so that the pump relay PR is energized when the switch S3 is closed. The line L28 is connected to NO relay contact 594, which is engageable with a contact 596 connected by the conductor 345 with one side of the pump motor 344, the other side of which motor is connected by the conductor 347 with line L9, whereby the pump motor 344 is energized to drive the pump. Another NO contact 598 of the pump relay PR is connected with line L13 and is engageable with contact 600 connected with line L5, which provides a holding circuit for the pump relay coil 590.

FIG. 26 shows the HIGH-LOW switch S2 in its low position for control of the cooking pot oil temperature by the low heat thermostat 382. This thermostat has a contact 602 connected by the conductor 388 with the switch contact 604 that is engaged by NC switch contact 606. Another contact 608 of the thermostat 382 is connected by the conductor 390 to one side of a capacitor C1, the other side of which is connected to NO contact 610 of the circulate valve relay CVR. The purpose of the capacitor C1 is to prevent burning of the thermostat contacts 602 and 608 as they break or make. The contact 610 is engageable with a contact 612, which is connected by a conductor 614 to coil pin 14 of relay R2. The NC contact 572 of the relay CVR engages a contact 616, which is connected by a conductor 618 with the coil pin 14 of the relay R3. The high heat control thermostat 370 has a contact 622 that is engageable by NO contact 624 of the switch S2. The thermostat 370 has a second contact 626 that is connected by the conductor 376 with the conductor 390. One end of a coil 628 of relay CVR is connected by a conductor 630 with the conductor 376 and the other side of the coil is connected by a conductor 632 to the line L9. Accordingly, when the relay coil CVR is de-energized, a circuit is completed to the coil of relay R3, and when the relay CVR is energized, a circuit is completed to the coil of relay R2.

One side of the HEAT switch S5, FIG. 26A, is connected by a conductor 634 to the line L8, and the other side of the switch S5 is connected to a multi-contact terminal illustrated as line L12. This line is connected to the conductor 406 extending from one contact of the heat tank thermostat 404, the other contact being connected to the conductor 408, which extends to contact 12 of relay R3, FIG. 26. The conductor 408 is also connected by a conductor 636 to contact 12 of relay R2. The FILTER signal light 469 is connected in line L12 and a capacitor C2 connected in parallel with the heat tank thermostat 404 between line L12 and conductor 408. The purpose of the capacitor C2 is to avoid arcing as the contacts of the heat tank thermostat 404 open or close.

The STORE switch S4 has NO contacts 640 and 642. The contact 640 is connected by a conductor 644 to the conductor 516 and the contact 642 is connected by a conductor 646 to line L13. The vacuum switch VC has a contact 648 that is connected by conductor 650 with line L13, and a contact 652 that is connected by a lead 654 with one side of a motor 656 for driving the timer T3. The other side of the motor 656 is connected by a conductor 658 with the line L9. The CHANGE-FILTER signal light 471 is connected in a conductor 660 in parallel with the motor 656.

Timer T3 has a NO contact 662 that is connected with the line L13 and a contact 664 engageable thereby, which is connected by a conductor 666 to the conductor 516 going to the normally closed contact 514 of timer T2.

The coils A' and B' of the solenoid valves A and B are connected to a common conductor 668 extending from the line L9. The coil A' is further connected by a conductor 670 with the contact 8 of relay R5. The coil B' is connected by the line L8' with the NC contact 506 of the SUMP switch S9. The coils C' and D' of the solenoid valves C and D are connected to a common conductor 672 extending from the line L9. The coil C' is connected by a conductor 674 with the contact 5 of relay R3; and the coil D' is connected by a conductor 676 with the contact 8 of relay R4 and contact 6 of relay R2. The coils E' and F' of the solenoid valves E and F are connected by a common conductor 678 extending from the line L9. The coil E' is connected by a conductor 680 to contact 8 of relay R6; and the coil F' is connected by the line L21 with the contact 7 of relays R1 and R2 and contact 6 of relay R3.

It will be seen from FIG. 26 that the coil pin 13 of each of the relays R1 to R6 is connected to the line L9 for completing a circuit to one side of the energizing coils of each of these relays. It will also be seen that certain of the contacts of the relays are interconnected to insure that only one relay at a time is energized. Thus, contact 14 of relay R1 is connected by the conductor 548 with the contact 11 of relay R4. The contact 11 of the relay R5 is connected by a conductor 544 with the contact 11 of relay R6. The NC contact 3 of relay R4 is connected by the conductor 546 with NC contact 3 of relay R5, NC contact 4 of relay R5 is connected by the conductor 584 with contact 5 of relay R6; and contact 5 of relay R5 is connected by the conductor 582 with NC contact 4 of relay R6.

The line L13 is connected with contacts 9, 10, 11 and 12 of relay R1; contacts 10 and 11 of relay R2; contacts 9 and 10 of relay R3; contacts 9, 10 and 12 of relay R4; contact 10 of relay R5; and contact 10 of relay R6. Line L5 is connected with contact 6 of each of relays R1, R4, R5 and R6.

At this time, the various phases of the cycle of the unit will be described from an operational standpoint without detailed reference to the circuitry by which they are achieved.

The unit is placed in operation by closing the ON-OFF master toggle switch S1, which completes the circuit to the blower motor 164 and to the conveyor motor 298, both of which run continuously. The UNIT ON signal light 463 is also energized. The manner in which the circuit to these and other components of the circuit are completed will be described in detail later.

The HIGH-LOW toggle switch S2 is operated to select the desired cooking pot temperature and the HEAT toggle switch S5 is also turned on. In other words, the three toggle switches, S1, S2 and S5 on the control panel 70 are actuated.

In first starting operation of the frying unit, the manual valve 352 should be checked to see that it is closed. The filter 216 must be installed and the filter bowl cover 228 mounted in place. The conveyor assembly 142 must also be in place.

The capacity of the present unit is 66 pounds of cooking oil. However, it is to be understood that this volume is exemplary only and that units of various capacities can be built embodying the principles of the present invention. Five gallons, or thirty-eight pounds of cooking oil are first poured into the cooking pot. The button of the STORE switch S4 is then pressed, which energizes the relay R4 to open the solenoid valves B and D, FIG. 22, and to start the timer T2. Only the energized valves are opened, all other valves remaining closed. When the valves B and D are open, the pump P will pump oil from the cooking pot 130, through the filter bowl 178, conduit 210, tube 396, past the valve D, through the chamber 398, tube 418 to the inlet 342 of the pump P for discharge through the pump outlet 348 into the tube 346, past valve A, through the chamber 138 and through tube 336 into the lower end of storage tank 326. This operation is timed by the motor driven timer switch T2, which maintains the valves B and D open for a period of ninety seconds. If the cooking oil is of a proper viscosity, the transfer of oil from the cooking pot 130 to the storage tank 326 can be done in about sixty seconds, since the capacity of the pump P is five g.p.m. If the cooking oil is thick and all of it has not been pumped into the storage tank 326 during the first ninety second period, the STORE switch R4 is pressed again, and the same valves D and B are opened for another ninety second interval and additional oil is removed from the cooking pot 130 along the same path previously described, and delivered to the storage tank 326. This phase of the cycle can be repeated as many times as is necessary to transfer all of the oil from the cooking pot 130 to the storage tank 326. The valves B and D, of course, close each time that the timer T2 "times out".

The remaining 28 pounds of cooking oil required to fill the system are next poured into the cooking pot 130 and the operator then depresses the button of the OPERATE switch S3, which energizes the relay R1 to open the solenoid valves A and F, respectively, and to start timer T1. The path of flow of the oil from the storage tank 326 to the heater tank 360 is then as illustrated in FIG. 19. However at this phase, no oil will be pumped from the heater tank 360 into the cooking pot 130. Thus, oil is pumped from the tank 326 through tube 336, past the valve A into the chamber 338, through tube 340 to the inlet 342 of the pump 344, discharged through the outlet 348 of the pump into the tube 346, then through chamber 428 and past valve F and into the tube 426 for delivery to the heater tank 360. The storage tank 326 and the heater tank 360 have equal capacity so that, in effect, oil is now being transferred from the storage tank 326 to the heater tank 360. Hence, oil will continue to be pumped into the heater tank 360 until the tank has been filled. The timer T1 will maintain the valves A and F open for a period of ninety seconds. If all of the oil has not been pumped out of the storage tank 326 within the first ninety second interval, then the OPERATE switch S3 can be actuated again, and this can be repeated as many times as may be necessary to get all of the oil out of the storage tank 326. Had the unit been in previous operation with oil in the heater tank 360 and oil stored in the storage tank 326, then as the oil was being pumped from the storage tank 326 into the heater tank 360, an equal volume of oil would be displaced from the heater tank through the tubes 366 and 378 and delivered to the cooking pot 130 to fill the cooking pot, as is shown in FIG. 19.

In normal operation, the pump 344 can empty the storage tank in a period of about sixty seconds. Therefore, the ninety-second time interval provided by the timers T1 and T2 is longer than is normally necessary to either fill or empty the cooking pot 130. As timer T1 "times out" valves A and F will be de-energized and close, and the relay R2 will be energized to open solenoid valves A and F. Relay R2 also energizes the heater control relay HR to automatically heat the oil in the heater tank 360. The circulation of the oil will then follow the path shown in FIG. 20.

It will be noted that valves A and B are closed at this time so that there is no communication between the storage tank 326 and the remainder of the system. Therefore, the pump 344 will pump oil out of the cooking pot 130, through the filter bowl 178, filter 216, conduit 210, tube 396, past the valve D, through valve chamber 398, tube 418 to the inlet 342 of the pump 344, from the pump discharge 348 into tube 346, through valve chamber 428, past the valve F, into tube 426, then into the bottom of the heater tank 360, through heater tank 360, and through the tubes 366 and 378 to respective nozzles 368 and 380 for discharge into the cooking pot 130. The cooking oil will continue to circulate through the cooking pot 130, and heater tank 360 until the low temperature thermostat 382 has been satisfied, indicating that the oil in the cooking pot is at a temperature of about 335°F; whereupon the relay R2 will be de-energized to close valves D and F and relay R3 energized to reopen the valves F and C. The unit is then ready to be used for cooking food.

Under such conditions, the cooking oil will continue to be circulated through the heater tank 360 and will by-pass the cooking pot 130. Such flow is illustrated diagrammatically in FIG. 21, wherein oil is pumped from the upper end of the heater tank 360 through the tube 400, into valve chamber 398, past the valve C, into tube 418 to the inlet 342 of the pump P, then from the pump discharge 348 into tube 346, tube 431, then through valve chamber 428, past the valve F, into tube 426 and then delivered to the heater tank 360. This circulation will normally continue until the food placed in the cooking pot 130 reduces the temperature of the oil in the cooking pot 130 to below the desired temperature, whereupon the low temperature thermostat 382 will again close, the relay R3 will be de-energized and the valves C and F will be closed, and the relay R2 will be energized to open the valves D and F, so that continuous circulation through the heater tank 360 and the cooking pot 130 will occur, as previously described. The relays R2 and R3 are alternately energized, functioning upon demand of the selected cooking pot thermostat throughout the cooking period.

Should the operator desire to operate with a higher temperature in the cooking pot, the HIGH-LOW switch S2 is actuated to its HIGH position, whereupon the relay R2 will be energized, the valves D and F will open, and the cooking oil will be circulated through the cooking pot 130 and heater tank 360, as illustrated in FIG. 20 and as previously described.

Figure 22:
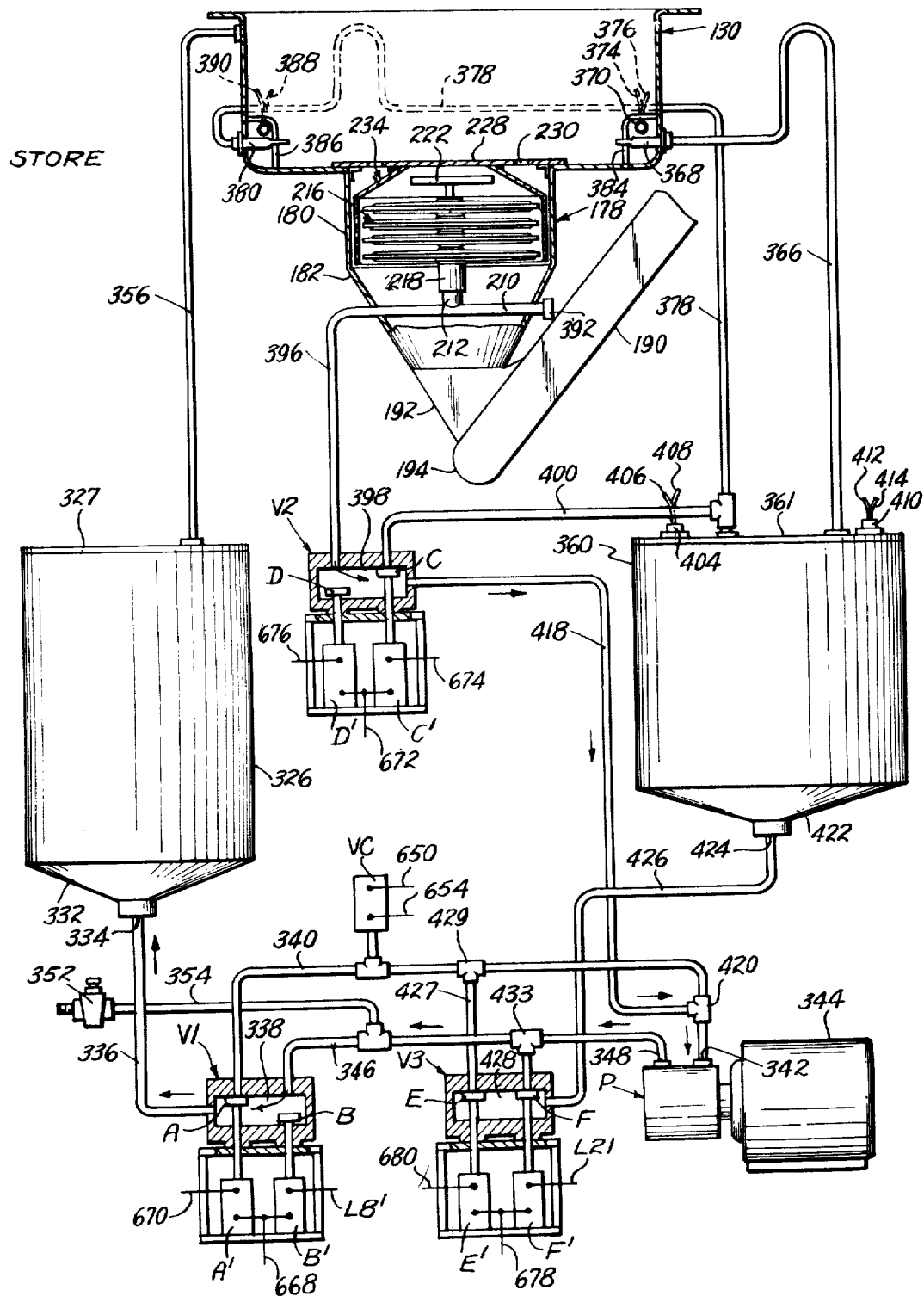
FIG. 22 illustrates the valves and direction of flow during a STORE phase to effect the return of cooking oil from the cooking pot to the storage tank.

In the normal operation of the unit, the filter 216 will require cleaning or changing one or more times each day, depending upon the amount of food that is being cooked and/or the amount of food particles present and the amount of batter and crumbs that have come off the food and have entered the filter bowl 178. In order to clean or replace the filter element 216, it is first necessary to remove the oil from the cooking pot 130, and this is done by pressing the STORE push buttom switch S4, conditioning the system for the same operation as described above in connection with transferring oil from the cooking pot 130 to the storage tank 326, and wherein the valves D and B are open to allow the oil to be pumped from the cooking pot 130 into the storage tank 326 as illustrated in FIG. 22. The filter 216 can be removed from the empty cooking pot 130 as previously described. After the filter 216 has been cleaned and/or replaced, and the filter bowl cover 228 has been restored, the OPERATE push button switch S3 is actuated, the valves A and F are opened, and the oil is then pumped from the storage tank 326 into the bottom of the heater tank 360. The heater tank 360 contains oil at this time, so that oil will be displaced from the heater tank 360 into the cooking pot 130 through the tubes 366 and 378 to the cooking pot 130 through the tubes 366 and 378 to refill the cooking pot.

During cooking, crumbs from the cooking pot 130 will flow with the circulating oil into the filter bowl 178 and eventually the filter unit 216 will start to clog. However, the conveyor 142 is operating continuously and removes the bulk of the crumbs from the crumb well 192.

the vacuum switch VC, which is connected with the inlet 342 of the pump P, may have its NO contacts 648 and 652 preset to close when a vacuum equivalent to about 11 inches of mercury is created in the tubing 396 and 418 between the filter 216 and the pump inlet 342. When the degree of vacuum for which the switch VC has been set is reached, it will close, energizing the CHANGE FILTER signal light 471 to warn the operator that the filter 216 requires cleaning. Timer T3 motor 522 is also energized so that at the end of a 90 second time interval, the oil will be automatically "stored" in the storage tank 326.

The system will remain in this dormant condition until the operator changes the filter 216, or ignores the change-filter signal warning and presses the OPERATE switch S3, in which event oil will start to be pumped back from the storage tank 326 to the heater tank 360 and into the cooking pot 130. The pumping of the oil from the storage tank 326, of course, will release the vacuum in the tube 340 connected with the vacuum switch VC, so that oil will be circulated through the heater tank 360, cooking pot 130 and filter 216, until a vacuum condition is again created in the tubes 396, 418 and 340, to again cause closing of the vacuum switch VC. Reclosing of the vacuum switch VC will again start the motor 522 of the timer T2 and energize the CHANGE FILTER signal light 417 and the automatic oil storing cycle described above will then be repeated. If the operator does not stop the unit and clean the filter 216, cooking oil will again be removed from the cooking pot 130 and pumped into the storage tank 326. This cycle will be repeated regardless of the number of times that the OPERATE switch S3 is actuated, until the filter 216 is removed and a clean filter is installed. This feature compels the operator to clean the filter because it disables the unit for normal cooking operations.

The 11 inches of mercury vacuum condition for which the vacuum valve VC is set is not itself critical and may vary as desired, but is preferable since it corresponds to about a 50% clogged condition of the filter, which, nevertheless, enables the pump P to pump oil from the filter bowl 178 into the storage tank in a period of about 70 to 75 seconds, which is well within the ninety-second operating interval of the timer T3. The pump P is a positive displacement pump and is designed to pump 5 gallons of cooking oil per minute. The normal vacuum, with a clean filter is only about 4 inches of mercury. Hence, the vacuum switch VC is operated well in advance of a 100% clogged condition of the filter 216, which would completely block all circulation.

After the filter 216 has been replaced, the unit can be put back into operation by pressing the OPERATE switch S3, whereupon the oil will be removed from the storage tank 326 and pumped through the heater tank 360 and into the cooking pot 130, as previously described under normal operating conditions.

Should it be desired to effect a complete oil change in the system, the front door 76 of the cabinet K is opened and a drain hose 462 is connected to the drain valve 352. The oil is removed from the cooking pot 130 and pumped into the storage tank 326, by operating the STORE switch S4, as previously described. The filter bowl cover 228 and the filter 216 are then removed. Since the pump P cannot remove oil from the filter bowl 178 and from the conveyor housing 190 to a level lower than the openings 226 in the filter core 218, provision is made for pumping out the remaining oil. Accordingly, the conveyor assembly 142 is removed from the conveyor housing 190. The adapter 430 is threaded onto the fitting 212, FIG. 23, and the pump-out hose 452 and plug 448 are mounted so that the hose 452 extends into the bottom of the conveyor crumb well 194. The drain valve 352 is manually opened. The free end of the drain hose 462 is inserted into a container of a capactiy of at least ten gallons. The push button SUMP switch S9, which is mounted on the door 464 of the control box 350, is then actuated by the operator to hold it closed, which energizes relay R4 to open the solenoid valve D. The motor 344 driving the pump P is also energized simultaneously with the opening of the valve D, so that cooking oil is withdrawn from the bottom of the crumb well through the pump-out hose 452, tube 450, adapter body cavity 436, conduit 210, tube 396 for flow through valve chamber 398 past valve D, through tube 418 to the inlet 341 of the pump P, then from the pump outlet 348 through tube 346, branch tube 354 and then through the drain valve 352 and drain hose 462. The strainer 214 mounted on the fitting 212 will prevent any crumbs from entering the conduit 210. After the conveyor housing crumb sump 194 has been emptied of oil, the switch S9 is released, interrupting all operations. The adapter 430 is removed from the filter bowl 178 and any crumbs remaining in the crumb sump can be manually wiped out with a cloth. The crumb conveyor assembly 142 is cleaned and replaced, a clean filter 216 is installed on the fitting 212, and the filter bowl cover 228 is replaced.

In order to drain the storage tank 326, the operator actuates the EMPTY TANK 1 switch S7 that is mounted on the door 464 of the control box 350. This efects energization of relay R5 to open the valve A and also energizes the pump P. The manual drain valve 352 must be open to allow the oil to be pumped from the storage tank 326 into the receiving container. Oil will then flow from the storage tank 326 into valve chamber 338, past the valve A, into tube 340 to the pump inlet 342, from the pump discharge 348 into tube 346, then into branch tube 354 and through the drain valve 352 into the drain hose 462.

The operator next presses the EMPTY TANK 2 switch S8 to effect emptying of the heater tank 360. This energizes the relay R6 to open the valve E and also energizes the pump P. The drain valve 352, of course, is permitted to remain open, and the pump P then withdraws oil from the lower end of the heater tank 360 through tube 426, into valve chamber 428, past the valve E, through tube 427 and 340 to the pump inlet 342, from the pump discharge 348 into tube 346, then into branch tube 354, through the drain valve 352 and then into the drain hose 462. The STOP switch S6 or the master switch S1 is operated to stop the pump P and de-energize relay R6 to close the valve E.

The cooking pot 130 should be wiped clean at this time, and the drain valve 352 closed and th hose 462 disconnected. The system is now ready to be filled with fresh cooking oil, and this can be done by following the procedure outlined above in connection with the initial filling of the unit with cooking oil. The blower 164, of course, continuously draws air into the cabinet K to cool the valves V1, V2, V3 and other components although most of these are covered with insulation (not shown).

More specifically, and with detailed reference to the control circuit, when the master ON-OFF switch S1 is closed, a circuit is completed from line L2 to line L8, FIG. 26A. Current will flow through the conductors 312 and 484 to the UNIT ON signal light 463 indicating that power is turned on and that the unit is ready for operation. The closing of the switch S1 also supplies current through conductor 170 to the blower of motor 164, the motor also being connected by conductor 172 with the lilne L9. Current is also supplied through conductor 312 to one side of the conveyor motor 298, the other side of which is connected to line L9 by the conductor 314. Thus, the blower 164 and conveyor motor 298 run continuously so long as the switch S2 is closed. The HIGH-LOW switch S2 and the HEAT switch S5 are actuated at this time.

When the OPERATE button of switch S3 is closed, current will be supplied from line L8 to coil pin 14 of relay R1 as follows: through NC contacts 486 and 488 of the STOP switch S6; NC contacts 494 and 500 of the SUMP switch S9, through conductor 502, NC contacts 504 and 512 of one of the switches controlled by timer T2, through the line L13 and switch S3, to line L5, through NC contact 538 and 540 of the timer switch T1, through conductor 542, NC contacts 3 and 11 of relay R6, conductor 544, NC contacts 3 and 11 of relay R5, conductor 646, and NC contacts 3 and 11 of relay R4 to conductor 548 connected to pin 14 of realy R1. The coil pin 13 of relay R1 is connected to the line L9 and completes the circuit. It may be here noted that at no time is more than one of the relays R1 to R6 energized.

As relay R1 is energized, a holding circuit therefore is completed through closing of its NO contacts 10 and 6 from line L13 to line L5, which goes to the contacts 530 and 532 of OPERATE switch S3, with currentflow to the relay coil, as above described. At the same time, the motor 556 of timer T1 is energized through closing of NO contacts 9 and 5 of relay R1 from line L13 through conductors 552 and 558, the circuit being completed from the motor through conductor 560 to line L9.

At the same time that current is supplied to the line L5 to energize the relay R1, it is also supplied to one side of the coil 590 of the pump relay PR closing NO contacts 598 and 600, and 594 and 596, the other side of the coil being connected by conductor 592 with line L9. In addition, current is applied from line L5 to conductors 534 and 536 to energize the OPERATE signal light 465, indicating that the unit is in operation. The closing of relay PR contacts 594 and 596 supplies current to one side of the pump motor 334 through lines L2 and L28, and conductor 345, the other side of the motor being connected by conductor 347 to line L9. This energizes the pump motor 344 to drive the pump P. The relay PR connects the line L11 to line L5 through the contacts 598 and 600 to provide a holding circuit for the coil 590 of the pump relay PR.

Energizing of relay R1 will also close contacts 12 and 8 to energize the coil A' through conductor 670 to open the valve A, and the closing of contacts 11 and 7 provides current to conductor L21 to open the valve F'. Opening of valves A and F allows oil to be pumped from the storage tank 326, through valves A, pump P, valve F and into heater tank 360, through the heater tank 360 into the cooking pot 130 to fill the cooking pot 130, as illustrated in FIG. 19. At this time, current is applied to line L27 from line L13 through the NC contacts 9 and 1 of the relay R4 and line L26 through the NC contacts 564 and 574 of the timer T1. As the motor 556 of timer T1 "times out", it interrupts the current to line L27 by opening NC contacts 564 and 574 of the timer T1. Contacts 562 and 566 are closed, applying current through the conductor 568 to the switch S2 and the low temperature cooking pot thermostat 382, through conductors 390, 376 and 630, to one side of the coil 628 of the relay CVR, an energizing circuit being completed through conductor 632 to the line L9. Closing the NO relay contacts 610 and 612 allows current to flow to the coil pin 14 of relay R2 through conductor 614, said pin 13 being connected to line L9 to complete the circuit. At the same time, NC contacts 538 and 540 of the timer T1 are opened, interrupting the previous flow of current to the coil of the relay R1 through the conductors 542, contacts 3 and 11 of relay R6, etc. as previously described, de-energizing relay R1.

With the HEAT switch S5 turned on, current flows from line L8, through switch S5 to line L12, through the heat tank thermostat 404, conductors 408 and 636 to closed relay contacts 12 and 8, supplying current through conductor 479 to one side of the coil 478 of the relay HR, the circuit being completed through conductor 412, through the overheat thermostat 410 and conductor 414 connected to line L9. Energizing of the relay HR will close its contacts a–a', b–b', and c–c', allowing current to flow from main lines L1, L2 and L3 to the heater grids 416. At this time, current is also supplied to the HEAT signal light 467 from the line L14 and conductor 412, which connect said light in parallel with the coil 478 of relay HR, indicating that the heater grids 416 are in operation. The heat relay HR can only be energized after the time T1 has "timed out". The timer T1 can only be energized through the relay R1.

Also at the same time, the NO contacts 10 and 6 of the relay R2 close, allowing current to flow from line L13 to conductor 676 to the coil D', energizing the valve D to open; and NO contacts 11 and 7 of the relay R2 close to connect line L13 with line L21 to energize the coil F' of the valve F to open the same.

The opening of valves D and F will allow oil to be pumped from the cooking pot 130 through the valve D, through the pump P, valve F, the heater tank 360, through the cooking pot 130 and filter 216, until such time as the selected cooking pot thermostat 382 has been satisfied. This operation is illustrated in FIG. 20.

Figure 21:
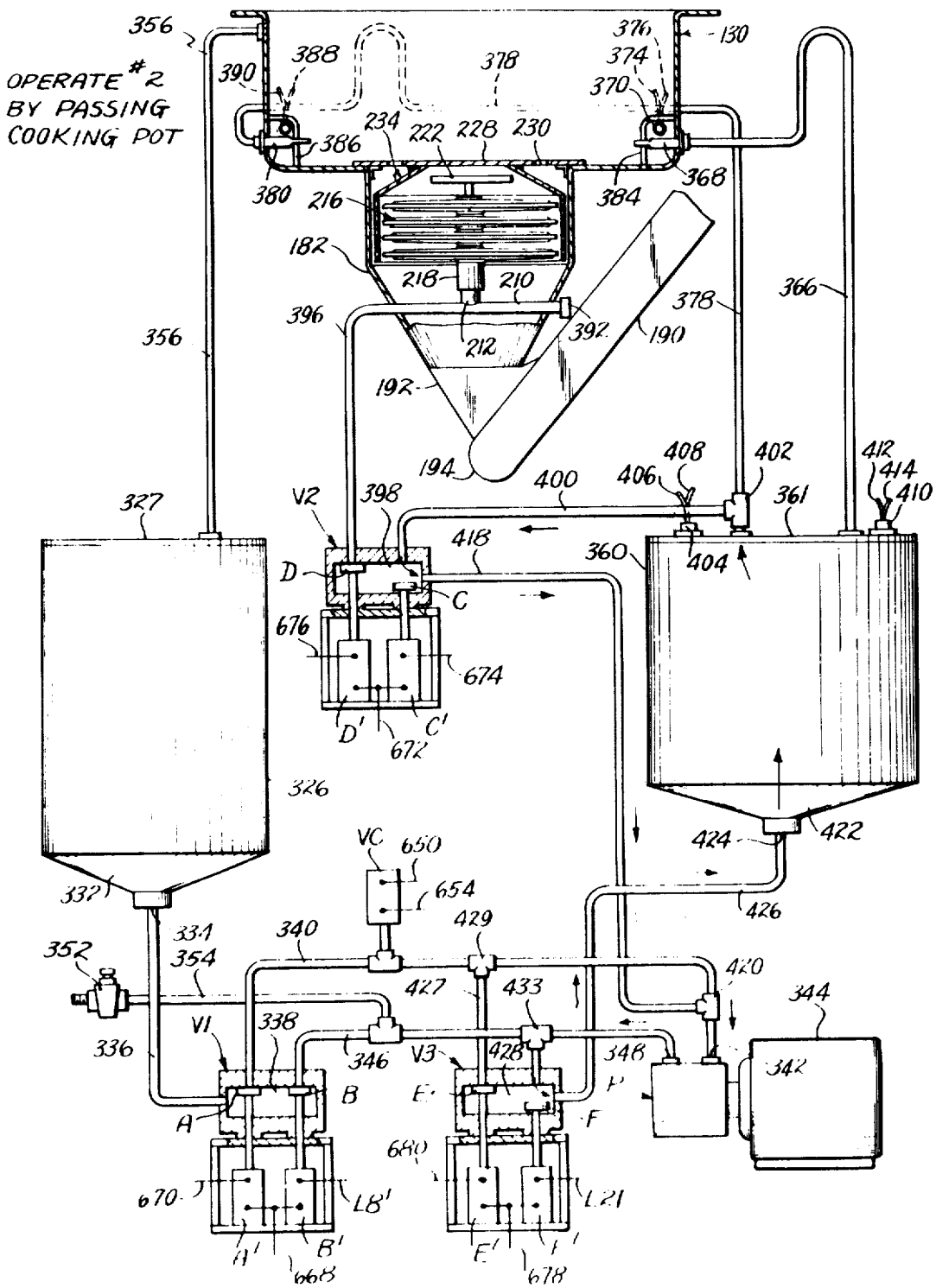
FIG. 21 is a view similar to FIG. 19, but illustrating the valves and direction of flow during bypassing of oil around the cooking pot with continuous circulation through the heater tank when the temperature of the oil in the cooking pot has reached the temperature for which the cooking pot thermostat has been set.

The NO contacts 550 and 554 of the timer T1 close upon "timing out" of the timer motor 556. As the oil in the cooking pot 130 reaches the desired temperature of the selected cooking pot thermostat 382, current is cut off from the relay CVR, opening the NO contacts 610 and 612 and also interrupting current supplied from the relay R2 and allowing current to flow to energize the coil of relay R3 through the NC contacts 572 and 616 of the relay CVR, which in turn closes the contacts 12 and 8 of relay R3 from conductor 408 to line L14 to energize the HEAT and OPERATE signal lights 467 and 465, respectively. At the same time, closing NO contacts 9 and 5 of the relay R3, completes the circuit between line L13 and conductor 674 supplying current to the coil C' of the valve C, opening the valve; and closing the NO contacts 10 and 6 of the relay R3, supplying current to conductor L21 going to the coil F' of the valve F to open said valve. The opening of the valves C and F allows oil to be pumped from the upper end of the heater tank 360 through the valve C, through pump P, through valve F and back to the lower end of the heater tank 360 to by-pass the cooking pot 130, as illustrated in FIG. 21.

As the oil in the cooking pot 130 cools off, either from natural heat dissipation or by food being placed in the oil, the low heat cooking pot thermostat 382 will close, causing the NC contacts 602 and 608 to be engaged, thereby causing coil 628 of relay CVR to be energized. This de-energizes relay R3 and energizes R2, as previously described. Valves F and C are closed and D and F are reopened. This causes hot oil from the heater tank 360 to flow into the cooking pot 130, until the oil in the cooking pot reaches a temperature that satisfies the thermostat 382, causing the thermostat contacts 602 and 608 to open and thereby effecting circulation of the oil through the heater tank 360 and by-passing of oil around the cooking pot 130, as previously described.

The system will cycle back and forth, in response to the demands of the selected thermostat in the cooking pot, so long as the unit is being used. In the event that the heat tank thermostat 404 fails to function, either because of damage or improper adjustment, or shorting out of the capacitor C2, which is connected across the thermostat, then, when the temperature in the heater tank reaches about 390°F, the NC contacts of the overheat thermostat 410 will open, interrupting the circuit between conductor 412 and line L9, so that current will cease to flow to the coil 478 of relay HR, thereby de-energizing the heating grids 416. Even if the overheat thermostat 410 should open, cooking oil will continue to circulate between the cooking pot 130, to the pump P, and through the heater tank 360. The unit can be continued to be used in this condition until the temperature of the oil in the cooking pot 130 is lowered to the point where the overheat thermostat 410 closes and again completes the circuit to the coil 478 of relay HR, energizing the heating grids 416. The fact that oil of a slightly higher temperature is being returned to the cooking pot 130 than that which would be returned in the normal operation of the device is not detrimental since the heating grids 416 will again be cut out when the temperature of the oil in the heater tank 360 reaches that for which the overheat thermostat 410 has been set.

When the oil temperature in the heater tank 360 reaches about 375°F, the thermostat 404 will open, interrupting current to conductor 408 going to the contacts 12 and 8 of relay R3 and conductor L14, and de-energizing the coil 478 of the heater relay HR and de-energizing the HEAT signal light 467. If, in the course of heating the oil, the thermostat 404 does not function and the heater grids 416 reach a temperature higher than that desired for the oil, the overheat thermostat 410, which is connected in series with the thermostat 404, will open at about 390°F, interrupting current from coil conductor 412 to the line L9, causing the heater relay HR to be de-energized. The overheat thermostat 410 will open, breaking the circuit to the heater relay HR and interrupting all current to the heater grids 416.

When it is desired to store the cooking oil, either for the purpose of changing the filter 216, or when cooking operations have been completed for the day, the button of the STORE switch S4 is pressed, supplying current to the coil pin 14 of the relay R$ through conductor 516 to energize the relay, the coil pin 13 being connected to line L9. At the same time, the current is supplied through conductor 516 to NC contacts 514 and 518 of the timer T2, thence to conductor 520 to energize the timer motor 522. As the relay R4 is energized, it also closes NO contacts 9 and 5 between lines L13 and L26 locking in the circuit to the motor of timer T2.

Current will be supplied from the conductor 520 through NC contacts 496 and 506 of the SUMP switch S9, and conductor L8' to the coil B' of the valve B, opening said valve. The NC contacts 9 and 1 of relay R4 are open, interrupting current to line L26 and NO contacts 562 and 566 of timer T1, thereby interrupting current to relay CVR NC contacts 572 and 616 and NO contacts 610 and 612 preventing R2 and R3 from being energized, thereby removing current from L14 and de-energizing the coil 478 of relay HR. At the same time, NO contacts 12 and 8 of relay R4 close, supplying current to the coil D' of the valve D, opening said valve. The opening of valves B and D allows oil to be pumped from the cooking pot 130 through the valve D, through the pump P and valve A into the storage tank 326. After a ninety second time interval, the motor 522 of timer T2 will "time out" due to opening of NC contacts 514 and 518; and opening of contacts 504 and 512 will interrupt current to line L13 going to the OPERATE switch S3, and de-energize the relay R4. At the same time, NC contacts 504 and 512, upon opening, interrupt all current to the pump relay PR to the motors of timers T1, T2 and T3, and all valves A, B, C, D, E and F, causing all operations to cease, except the driving of the blower motor 164 and the conveyor motor 298.

This operation also takes place automatically if the filter 216 should become clogged, creating a vacuum condition at the inlet 342 of the pump R. The timer T3 can only be energized by the vacuum switch VC. When the vacuum in the pump inlet 342 reaches the setting of the switch VC, the timer T3 is energized for ninety seconds after closing of the contacts 648 and 652, allowing current to flow from the line L13 to the motor 656 of the timer T3, through conductor 654, and to the CHANGE FILTER signal light 471 through conductor 660. After the time interval of ninety seconds, the motor 656 of timer T3 will "time out" causing the NO contacts 662 and 664 to close and allow current to flow from line L13 to conductor 516, thus causing the same operation as results from pressing the STORE switch S4, since the contacts 662 and 664 are connected in parallel with the switch S4, that is, the oil is automatically stored.

The operator must install clean filter, otherwise normal cooking operations cannot be resumed, as previously explained.

In order to drain oil from the coveyor sump or crumb well 192, the filter 216 and conveyor assembly 142 are removed, as previously described, and the pump-out adapter 430 is mounted on the fitting 212, and the pump-out hose 452 assembled therewith. The manual drain valve 352 is opened and the drain hose 462 is connected thereto. The SUMP switch S9 is pressed causing its NO contacts 498 and 508 to engage, allowing current to flow from line L8 through the conductor 520, energizing motor 522 of the timer T2, and at the same time allowing current to flow from conductor 520 through NC timer contacts 514 and 518 to the conductor 516 going to the coil pin 14 of relays R4 to energize the relay. When relay R4 is energized, it closes NO contacts 9 and 5 allowing current to flow through conductor 526 to line L13, then through the NO contacts 12 and 8 of relay R4, and through conductor 676 to the coil D' of the valve D, opening said valve. At the same time, NO contacts 10 and 6 of relay R4, close, allowing current to flow from line L13 to line L5, causing the coil 590 of pump relay PR to be energized, closing NO contacts 594 and 596 allowing current to flow through line L28 to the pump motor 344. At the same time, NO contacts 598 and 600 of the relay PR close, allowing current from line L13 to complete a holding circuit to the coil 590 of the pump relay PR through line L5. At the same time, the NC contacts 11 and 3 of the relay R4 are opened, preventing relay R1 from being energized, and the NC contacts 9 and 1 of relay R4 are opened, interrupting all current flow beyond this point.

The opening of valve D allows oil to be pumped from the crumb well 192 through the valve D and through the manual pumpout valve 352, as illustrated in FIG. 23.

After the conveyor SUMP 192 has been pumped out, the SUMP switch S9 is released interrupting all current flow from conductor 520 and causing all relays to return to their de-energized position, and allowing current to be supplied from line L8 to line L13 through the NC contacts 504 and 512 of the timer T2, NC contacts 494 and 500 of the SUMP switch S9, conductor 492, and NC contacts 494 and 500 of the STOP switch S6.

In order to empty or drain oil from the storage tank 326, the EMPTY TANK 1, Switch S7 must be pressed. This allows current to flow from line L8 through the STOP switch S6, to the NC contacts 494 and 500 of the SUMP switch S9, through NC contacts 504 and 512 of timer T2, to the line L13, then through NC contacts, 9 and 11 of the relay R4, through NC contacts 564 and 574 of timer T1 to line L27, through the switch S7 and conductor 580 to coil pin 14 of relay R5 to energize the relay R5. As the relay R5 is energized, a holding circuit is established for the relay coil of R5 through NO contacts 9 and 5 and through NC contacts 12 and 4 of the relay R6, the contact 12 being connected to line L27 and contact 4 being connected to conductor 562 going to contact 9 of relay R5, which latter bridges to contact 5 of relay R5, which, in turn, is connected to coil pin 13 by the conductor 580. At the same time, current is supplied through NO contacts 10 and 6 of relay R5 from line L13 to line L5 to energize the coil 590 of the pump relay PR, causing the NO contacts 598 and 600, and 594 and 596 to close, allowing current to flow from line L28, through the contacts 594 and 596 to the motor 344 of the pump P. Current is supplied from line L13 to pump relay contacts 598 and 560 to line L5 completing the circuit to the coil 590 of the pump relay PR. At the same time, NC contact 11 and 3 of the relay R5 are opened, preventing current from being supplied to relay R1, which controls filling of the cooking pot. Also at the same time, NC contacts 12 and 4 of the relay R5 open preventing relay R6 from being energized, as by inadvertant closing of EMPTY TANK 2, switch S8.

In addition, NO contacts 12 and 8 of relay R5 close, connecting line L27 to conductor 670 and allowing current to be supplied to the coil A' of the valve A, opening said valve. This allows oil to be pumped from the storage tank 326 through the valve A for draining through the manual valve 352, as shown in FIG. 24. This draining operation is allowed to continue until all oil has been drained from the storage tank 326. At this time, either the STOP switch S6 may be pressed, stopping all operations, or the EMPTY TANK 2, switch S8 may be pressed, supplying current from line L27 to line L24 going to coil pin 14 to energize relay R6. Upon energizing relay R6, NC contacts 12 and 4 of relay R6, between line L27 and conductor 582 going to NO contacts 9 and 5 of relay R5, are opened, breaking the circuit previously completed by conductor 580, causing the relay R5 to be de-energized. Also at this time, the NO contacts 9 and 5 of relay R6 are closed, allowing current to flow from line L27 through NC contacts 12 and 4 of the relay R5 to conductor 584 and line L24 completing a holding circuit to the coil pin 14 of relay R6. At the same time also, the NO contacts 10 and 6 of relay R6 between line L13 to line L5 are closed causing current to flow to line L5, energizing the coil 590 of the pump relay PR to keep the pump motor 344 running. At the same time, the NC contacts 11 and 3 of the relay R6 open, preventing the coil of relay R1 from being energized. At the same time, the Nc contacts 12 and 4 of relay R6 open to prevent relay R5 from being energized while the relay R6 is energized. Further, at the same time, NO contacts 12 and 8 of the relay R6 close, allowing current to flow from line L27 to conductor 680 to the coil E' of the valve E, causing the valve E to open and allow oil to be pumped from the heater tank 360 through the valve E, through the pump P and to be discharged through the manual valve 352, as illustrated in FIG. 25. This pump-out operation continues until either the STOP switch S6 is pressed, or the ON-OFF master switch S1 is turned off. The manual valve 352 must be closed after draining of the unit has been completed and before the system is refilled with fresh cooking oil.

It will be understood that the cooking oil circulates through the heater tank 360 at all times, except during a storing operation and during draining of the oil from the crumb sump 192, from the storage tank 326, and from the heater tank 360. TRhe pump P is driven for all operations, which is provided for by a contact on relays R1 to R6 each having an electrical connection with the coil of the pump relay PR.

It will also be understood that two solenoid valves are energized at the same time to control the normal phases of the operational cycle of the unit, but that different single valves are energized during pumping out of the crumb sump 192 and during draining of the storage tank 326, and the heater tank 360. This will be readily apparent from the following tabulation.

VALVES

| | A | B | C | D | E | F |
|---|---|---|---|---|---|---|
| Filling Cooking Pot. | Open | | | | | Open |
| Operation 1, Circulation through Cooking Pot | | | | Open | | Open |
| Operation 2, Bypassing cooking pot | | | Open | | | Open |
| Storing Oil | | Open | Open | | | |
| Pumping Out Crumb Well | | | Open | | | |
| Emptying Storage Tank | Open | | | | | |
| Emptying Heater Tank | | | | | Open | |

During certain cooking operations, it is desirable to have the cooking oil circulated continuously through the cooking pot 130 under control of the high temperature cooking pot thermostat. This can be accomplished by substituting for the present SPDT HIGH-LOW switch S2, a DPDT switch S2', as shown in the fragmentary portion of the circuit of FIG. 27. As is here shown, a high temperature thermostat 370a would have no direct connection to the coil 628 of the relay CVR, and is arranged so as to overide the heat tank termostat 404, allowing the cooking oil to continuously circulate through the cooking pot with the valves D and F open at all times. More specifically, a low temperature thermostat 382a is connected in the circuit in the same way as the thermostat 382, except that the contact 606 is now a NO contact and is engageable with the contact 604 and the contacts 622 and 624 are NC contacts, and the contact 622 is connected by the conductor 630 with the coil 590 of the relay CVR to energize the same. The contacts 604 and 606 are now NO contacts, with the common contact 670 being connected to the conductor 568, which extends from NO contact 566 of the timer T1.

The switch S2' has NC contacts 625 and 627. The contact 627 is connected by a line L12 to one side of the heat tank thermostat 404, the other side of which is connected to contact 626 of the high temperature cooking pot thermostat 370a by the conductor 408. The contact 620 of the thermostat 370 is connected by a conductor 374 to NC contact 625 that is engaged by the contact 627. The capacitor C2 and the FILTER signal light 469 remain connected in parallel with the HEAT switch S5, and the heat tank thermostat 404, as previously described.

With switch S2 in its HIGH position, when the OPERATE switch S3 is closed, it will energize relay R2, as before, to open valves D and F. However, if the high heat thermostat 370a is satisfied and opens, it will have no effect on the relay CVR, since it continues to be energized, and relay R2 will remain energized, preventing bypassing of oil around the cooking pot.

It will be understood that other variations may be made in the control circuit, and in the construction and arrangement of the components of the fryer unit without departing from the principles of the invention or the scope of the annexed claims.

I claim:

1. The method of removing crumbs from the cooking oil of a fryer unit having a cooking zone, comprising the steps of: maintaining a body of crumb-containing cooking oil in the cooking zone at a cooking temperature; diverting at least a portion of the crumbs in the cooking oil to another zone containing a body of entrapped cooking oil at a temperature substantially lower than that in said cooking zone; and removing the crumbs from the entrapped body of oil in said zone of lower temperature by passing a moving element through the entrapped body of cooking oil in the zone of lower temperature.

2. The method as defined in claim 1, including the step of: removing the crumbs from the cooking oil by continuously passing a moving element through the entrapped body of cooking oil in the zone of lower temperature.

3. The method of removing crumbs from the cooking oil of a fryer unit including a cooking pot, comprising the steps of: introducing crumb containing cooking oil at substantially cooking temperature into a zone containing a filter and having a crumb collecting well below the filter; passing said oil through the filter and removing the filtered oil at a level in said zone above the crumb well; circulating the cooking oil through the cooking pot before introducing the same into the zone containing the filter; maintaining a body of oil entrapped in said crumb well for collecting crumbs not removed by the filter; and removing the collected crumbs from the entrapped oil in the crumb well.

4. The method of removing crumbs from the cooking oil of a fryer unit having a cooking zone, comprising the steps of: maintaining a body of crumb-containing cooking oil in the cooking zone at a cooking temperature; diverting at least a portion of the crumbs in the cooking oil to a crumb collecting zone containing a body of entrapped cooking oil at a temperature substantially lower than that in said cooking zone; allowing the crumbs to settle by gravity toward the lower portion of the entrapped body of cooking oil; removing the crumbs from the entrapped body of oil in said zone of lower temperature; and withdrawing cooking oil at a level above said zone of lower temperature and returning the same to said cooking zone.

5. The method of removing crumbs from the cooking oil of a fryer unit having a cooking zone, comprising the steps of: maintaining a body of crumb-containing cooking oil in the cooking zone at a cooking temperature; passing the cooking oil through a filtering zone to separate crumbs from the cooking oil; diverting at least a portion of the crumbs in the cooking oil to another zone containing a body of entrapped cooking oil at a temperature substantially lower than that in said cooking zone; allowing the diverted crumbs to settle by gravity toward the lower portion of the entrapped body of cooking oil; removing the crumbs from the entrapped body of cooking oil in said zone of lower temperature; and diverting the cooking oil to a storage zone in response to a given resistance to flow through said filtering zone due to clogging of said filtering zone caused by the crumbs separated from the cooking oil.

* * * * *